United States Patent
Kaku et al.

(10) Patent No.: US 9,352,666 B2
(45) Date of Patent: May 31, 2016

(54) VEHICLE SEAT

(75) Inventors: Hiroyuki Kaku, Tochigi (JP); Masaya Furuta, Tochigi (JP); Hidetoshi Ozawa, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 90 days.

(21) Appl. No.: 14/238,031

(22) PCT Filed: Aug. 2, 2012

(86) PCT No.: PCT/JP2012/069706
§ 371 (c)(1),
(2), (4) Date: Feb. 10, 2014

(87) PCT Pub. No.: WO2013/021912
PCT Pub. Date: Feb. 14, 2013

(65) Prior Publication Data
US 2014/0183918 A1      Jul. 3, 2014

(30) Foreign Application Priority Data

Aug. 10, 2011 (JP) ................. 2011-175434
Aug. 10, 2011 (JP) ................. 2011-175435
Aug. 10, 2011 (JP) ................. 2011-175455
Aug. 10, 2011 (JP) ................. 2011-175458
Sep. 29, 2011 (JP) ................. 2011-213816

(51) Int. Cl.
*B60N 2/16*     (2006.01)
*B60N 2/42*     (2006.01)
*B60N 2/00*     (2006.01)

(52) U.S. Cl.
CPC ........ *B60N 2/16* (2013.01); *B60N 2/002* (2013.01); *B60N 2/165* (2013.01); *B60N 2/1615* (2013.01); *B60N 2/4228* (2013.01)

(58) Field of Classification Search
CPC ....................................................... B60N 2/16
USPC .................... 297/344.12, 344.14, 452.49
See application file for complete search history.

(56) References Cited

U.S. PATENT DOCUMENTS 4,556,185 A * 12/1985 Takagi ..................... 248/421
5,368,368 A * 11/1994 Fukui et al. ............. 297/452.18

(Continued)

FOREIGN PATENT DOCUMENTS

| EP | 1 813 465 A2 | 8/2007 |
| EP | 1 813 465 A3 | 5/2010 |

(Continued)

OTHER PUBLICATIONS

Office Action issued in counterpart Japanese Application No. 2011-175458 on Jun. 30, 2015 and corresponding English translation.

(Continued)

*Primary Examiner* — Timothy J Brindley
(74) *Attorney, Agent, or Firm* — Hamre, Schumann, Mueller & Larson P.C.

(57) ABSTRACT

A vehicle seat with a height adjustable seat bottom, includes left and right side frames each including a main body portion extending in a front-rear direction and a mount portion for a seat back frame protruding from a rear portion of the main body portion, which side frames constitute left and right frames of the seat bottom, a height adjustment mechanism configured to allow the left and right side frames to be lifted and lowered, and an operation unit including an operation knob configured to be operated by an occupant to cause the height adjustment mechanism to be actuated which operation unit is fixed to one of the left and right side frames. The operation unit is so disposed that at least a part thereof lies over the mount portion.

18 Claims, 17 Drawing Sheets

(56) References Cited

U.S. PATENT DOCUMENTS

| | | | |
|---|---|---|---|
| 5,624,161 A * | 4/1997 | Sorimachi et al. | 297/452.52 |
| 5,775,661 A * | 7/1998 | Matsumoto et al. | 248/421 |
| 6,676,218 B2 * | 1/2004 | Fujita et al. | 297/452.49 |
| 6,729,594 B2 | 5/2004 | Ikegaya | |
| 7,278,686 B2 * | 10/2007 | Yoshida | 297/338 |
| 7,717,509 B2 * | 5/2010 | Kojima | 297/216.2 |
| 8,585,148 B2 * | 11/2013 | Yamada et al. | 297/344.15 |
| 8,616,636 B2 * | 12/2013 | Arata | 297/216.16 |
| 2003/0222192 A1 | 12/2003 | Ikegaya | |
| 2005/0046256 A1 | 3/2005 | Yamada | |
| 2007/0158988 A1 * | 7/2007 | Yoshida | 297/344.14 |
| 2007/0273193 A1 * | 11/2007 | Ichikawa et al. | 297/344.12 |
| 2009/0127907 A1 * | 5/2009 | Hoshi et al. | 297/344.12 |
| 2010/0001569 A1 | 1/2010 | Shinozaki | |
| 2012/0043799 A1 * | 2/2012 | Breitfeld et al. | 297/344.12 |
| 2015/0151653 A1 * | 6/2015 | Furuta | 297/344.14 |

FOREIGN PATENT DOCUMENTS

| | | |
|---|---|---|
| EP | 1 813 465 B2 | 1/2012 |
| JP | H-0752696 | 2/1995 |
| JP | 2002-160562 A | 6/2002 |
| JP | 2004-1593 A | 1/2004 |
| JP | 2005-075054 | 3/2005 |
| JP | 2007-30843 | 2/2007 |
| JP | 2007-062530 | 3/2007 |
| JP | 2007-202627 A | 8/2007 |
| JP | 2007-308050 | 11/2007 |
| JP | 2008-54715 A | 3/2008 |
| JP | 2008-265365 | 11/2008 |
| JP | 2009-227208 A | 10/2009 |

OTHER PUBLICATIONS

Office Action issued in counterpart Japanese Application No. 2011-175455 on Jun. 30, 2015 and corresponding English translation.

Office Action issued in counterpart Japanese Application No. 2011-175435 on Jun. 30, 2015 and corresponding English translation.

Office Action issued in counterpart Japanese Application No. 2011-175434 on Jun. 30, 2015 and corresponding English translation.

* cited by examiner

FIG.5
(a)
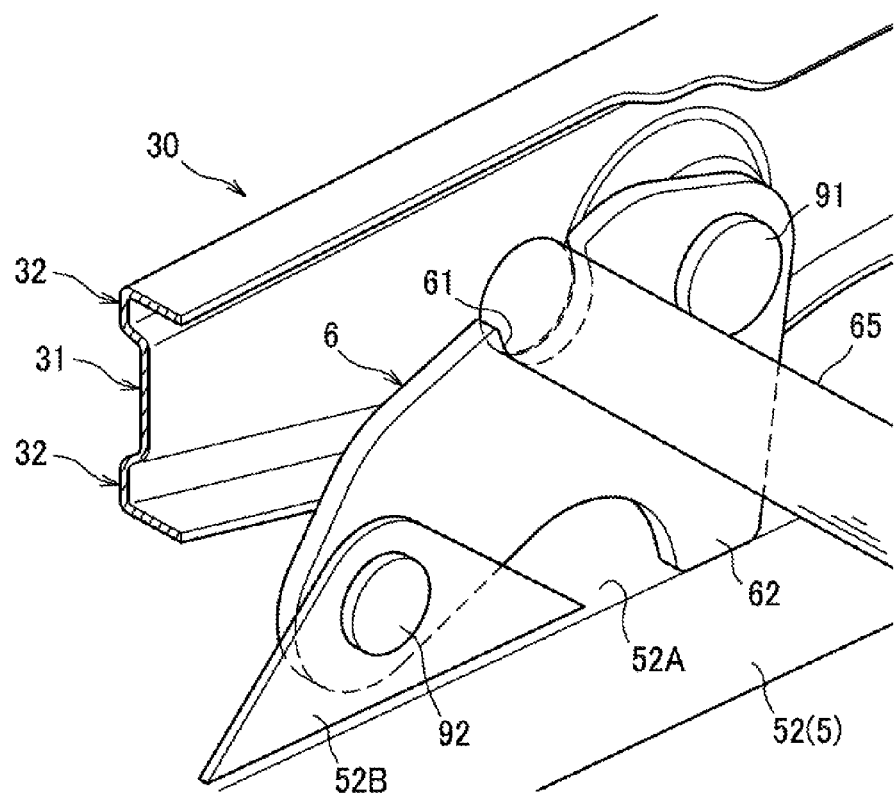
(b)
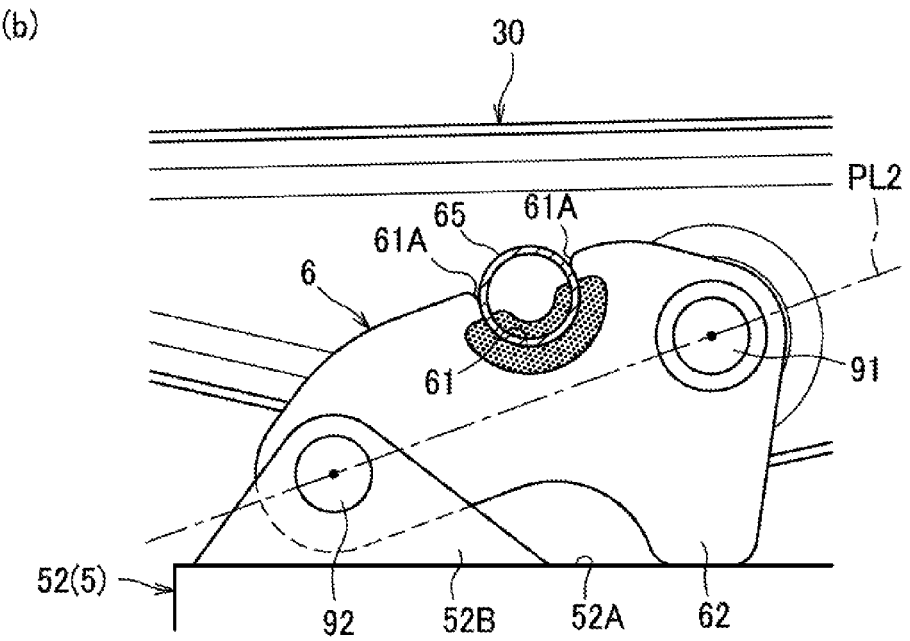

FIG.6
(a)
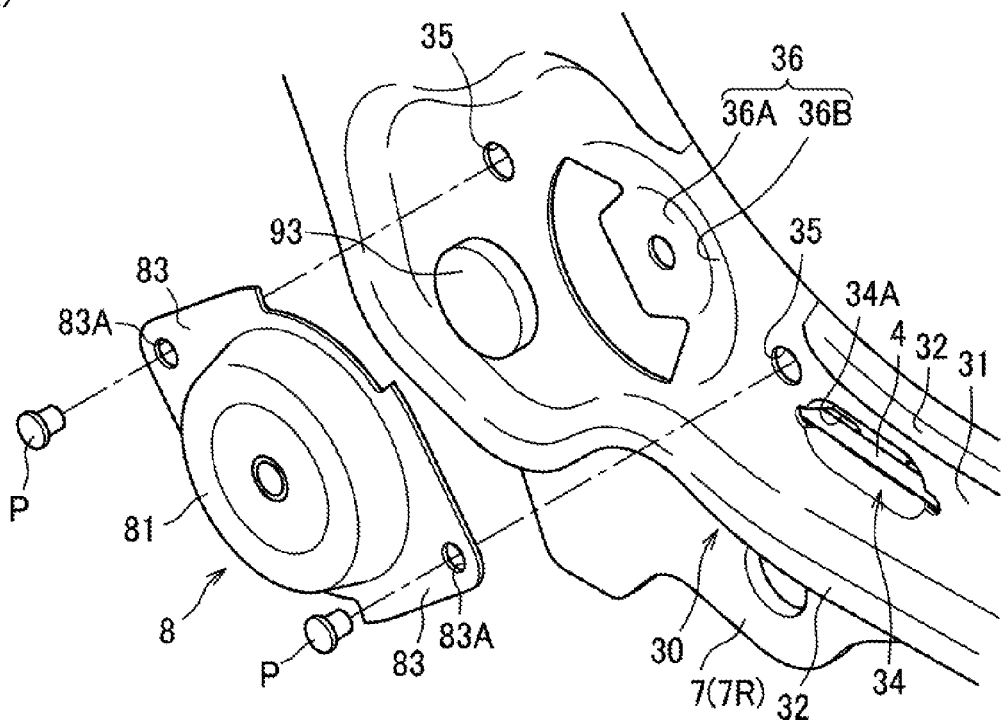
(b)
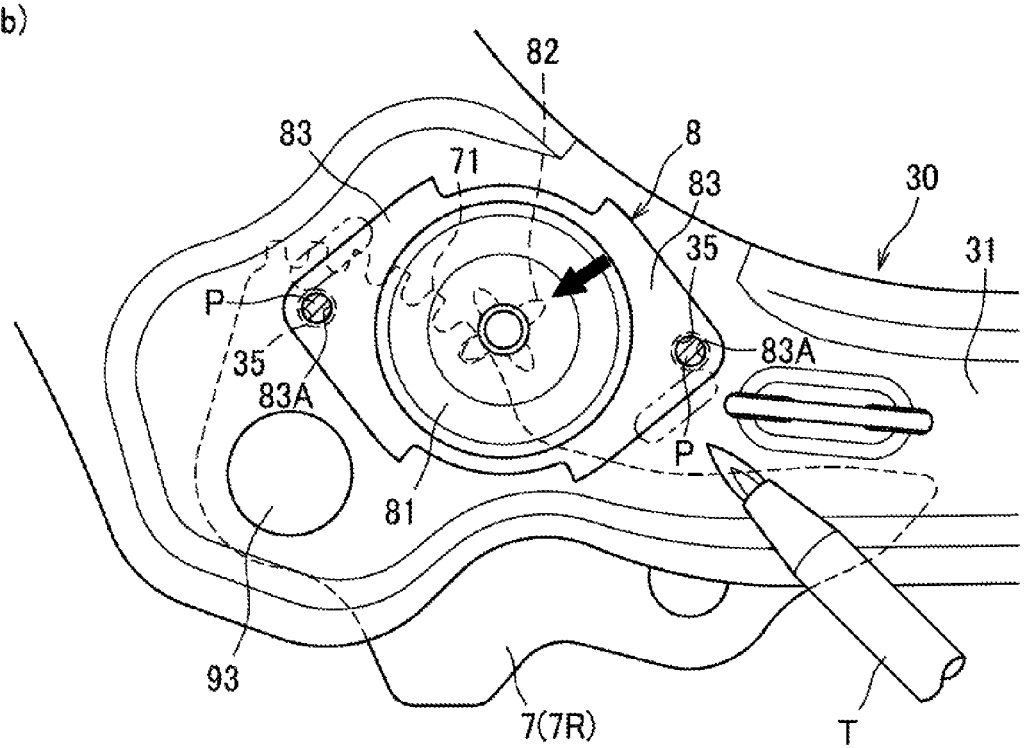

FIG.7
(a)
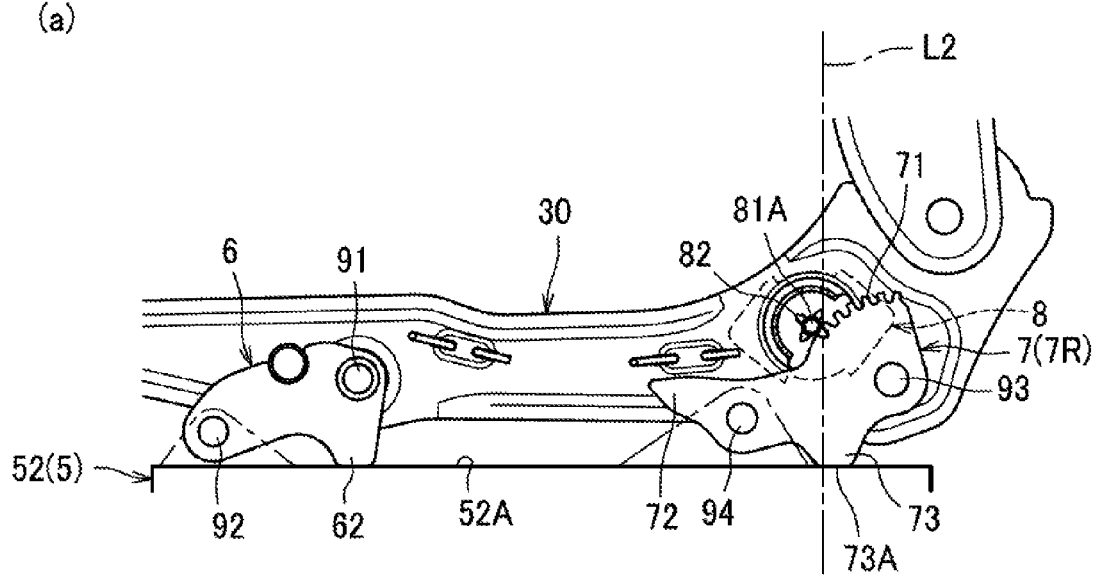
(b)
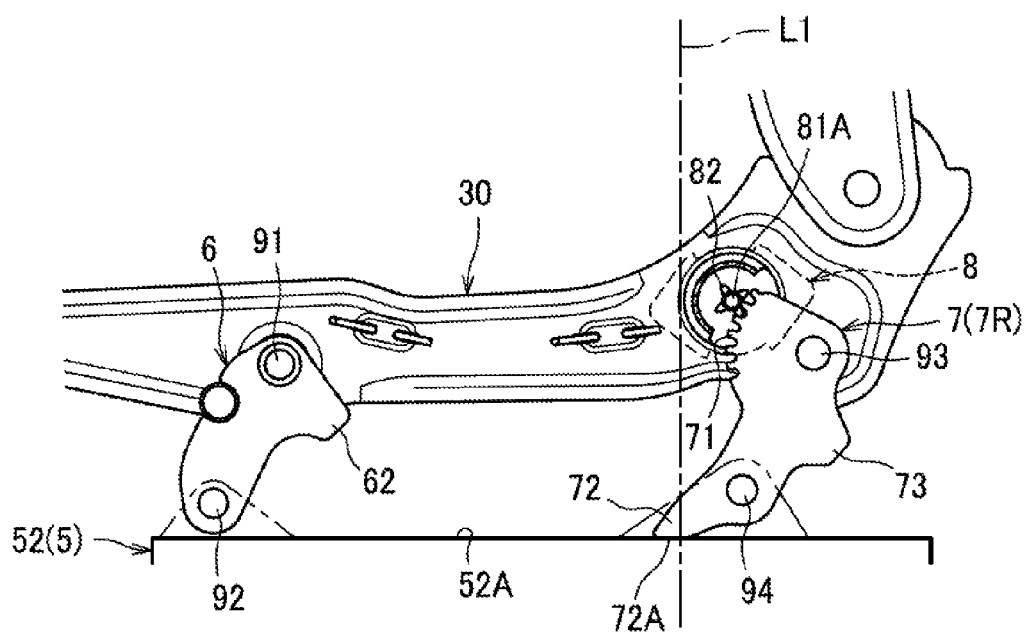

FIG.16
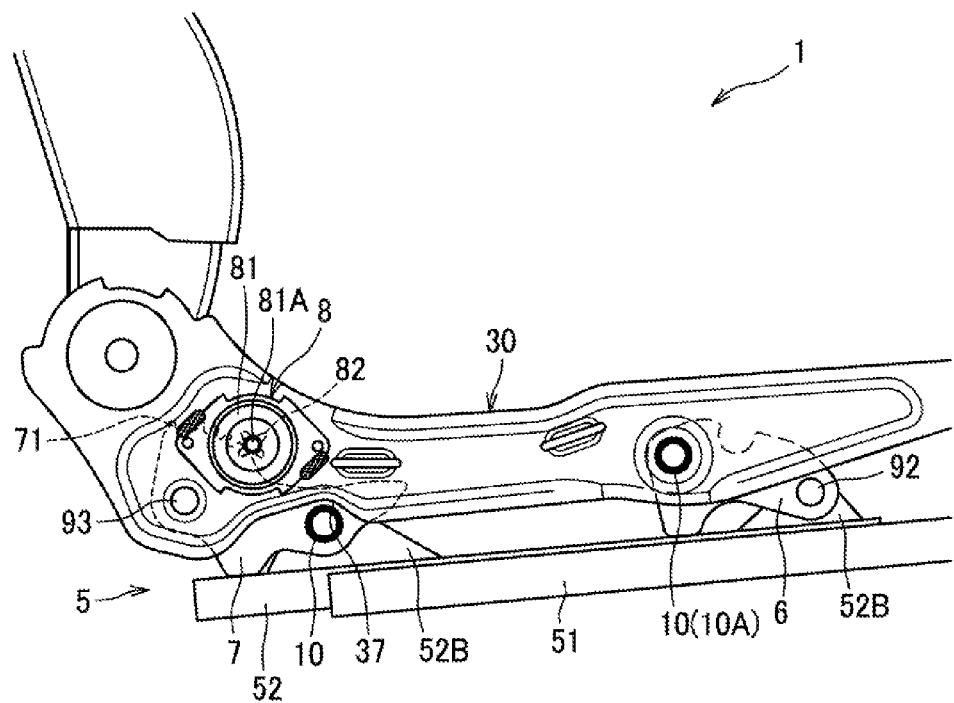
(a)
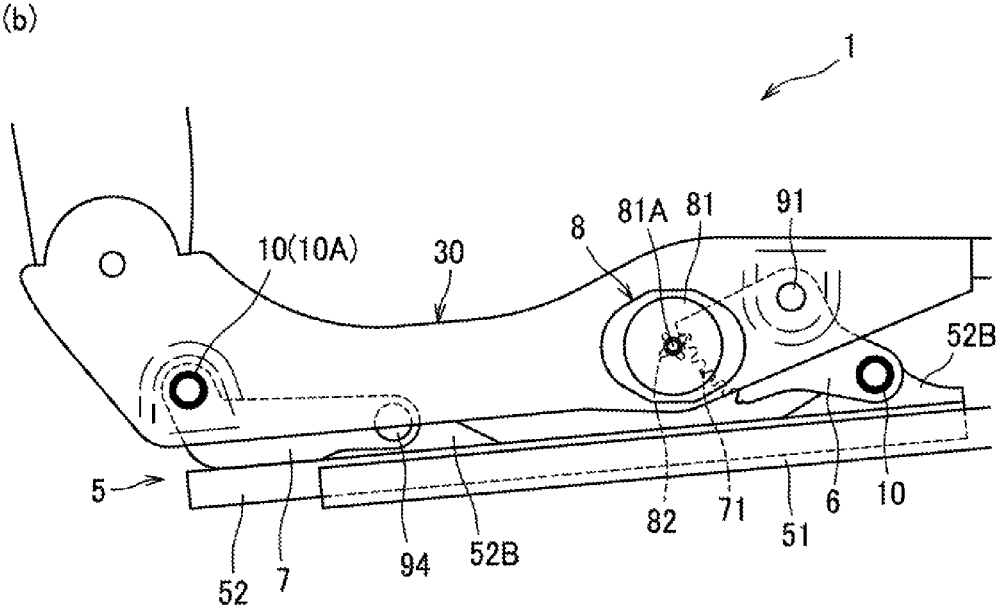
(b)

VEHICLE SEAT

TECHNICAL FIELD

The present invention relates to a vehicle seat with a height-adjustable seat bottom.

BACKGROUND ART

A vehicle seat, such as a car seat, with a height-adjustable seat bottom is hitherto known in the art. For example, Patent Literature 1 discloses a car seat in which left and right seat frames (side frames), a seat riser provided below the side frames, and a front link and a rear link interposed between the side frames and the seat riser constitute a four-bar linkage, wherein an actuating means (operation unit) provided at one of the side frames is operated to actuate the four-bar linkage so that the side frames, and thus the seat bottom, are raised and lowered.

On the other hand, Patent Literature 2 discloses an automobile seat comprising a linkage (height adjustment mechanism) for raising and lowering left and right cushion side frames, and an operation unit including an operation knob, a pinion gear and the like wherein a rotational motion imparted to the operation knob causes the height adjustment mechanism to be actuated.

Further, a vehicle seat comprising a detection sensor, such as a seat weight sensor, a seat position sensor and the like, for sensing the status of a seat bottom so as to exercise control over the operations of facilities (e.g., airbag) equipped in a vehicle is known in the art. For example, in Patent Literature 3 discloses a car seat in which a detection sensor (load sensor) for detecting a load acting on a seating surface is disposed at the sides of the seat cushion.

CITATION LIST

Patent Literature(s)

Patent Literature 1: JP 2008-265365 A
Patent Literature 2: JP 2007-308050 A
Patent Literature 3: JP 2005-75054 A Incidentally, in recent years, vehicle seats configured to be compact in size have been much sought after. To a side frame thereof, however, an operation unit of a prescribed size is attached; therefore, such a conventional configuration imposes limits on improvement in its compactness. A particular configuration of a vehicle seat in which both of an operation unit and a detection sensor are provided may specifically require consideration to separate arrangement of the operation unit and the detection sensor for avoiding interference between the operation unit and the detection sensor, or space to be made for suppressing the interference, which would possibly make it difficult to achieve compactness.

In this respect, it would be desirable to provide a vehicle seat in which improved compactness (particularly, compactness of the side frame in its height direction) can be achieved.

SUMMARY OF INVENTION

In a first aspect of the present invention, a vehicle seat with a height adjustable seat bottom is disclosed. This vehicle seat comprises: left and right side frames each including a main body portion extending in a front-rear direction and a mount portion for a seat back frame, the mount portion protruding from a rear portion of the main body portion upward, the left and right side frames constituting left and right frames of the seat bottom; a height adjustment mechanism configured to allow the left and right side frames to be lifted and lowered; and an operation unit including an operation member configured to be operated by an occupant to cause the height adjustment mechanism to be actuated, the operation unit being fixed to one of the left and right side frames, wherein the operation unit is so disposed that at least a part thereof lies over the mount portion.

With this configuration, in which the operation unit is so disposed that at least a part of the operation unit lies over the mount portion, the main body portion can be downsized in the upper-lower direction (i.e., made low in profile) accordingly. This makes it possible to achieve compactness of the side frame in height.

Herein, the operation member may be, for example, of a dial type or a lever type. If the lever-type operation member is adopted, such arrangement of the operation unit in the rear portion of the side frame that at least a part thereof lies over the mount portion increases the flexibility of arrangement/position of the portion of the lever to be operated by an occupant. This can improve the easy operability of the operation member.

In the above-described vehicle seat, the height adjustment mechanism may comprise a four-bar linkage which includes: the respective side frames; left and right rear links rotatably joined to the rear portions of the main body portions; left and right front links rotatably joined to the main body portions at positions frontward of the rear links; and a link support member disposed below the side frames and configured to support the rear links and the front links in a manner that permits the front and rear links to rotate; and wherein a drive shaft of the operation unit is disposed above a plane connecting a side frame-side center of rotation of the front links and a side frame-side center of rotation of the rear links.

This configuration is such that the operation unit is disposed above the range of actuation of the four-bar linkage, and thus serves to achieve compactness in the height of the side frames without obstructing the motions of the rear links and the front links.

In each of the above-described vehicle seats, an optional configuration may be such that the side frames comprise a flange portion disposed around a region thereof which leastwise includes a wall to which the operation unit is fixed, and configured to protrude in one of left and right directions that faces outward relative to the wall and to extend along upper and lower edges of the side frames, and a first gap portion disposed on the edges of the side frames around a region thereof at which the main body portion and the mount portion are joined together, and configured to be flush with the wall whereby a gap is formed in the flange portion; and wherein the operation unit is disposed to face the first gap portion.

With this configuration, the side frames can be made more compact in height in comparison with the configuration in which the operation unit is in a position closer to the flange portion provided at the upper and lower edges. Furthermore, the side frames provided with the flange portion protruding relative to the wall to which the operation unit is fixed are generally configured to have irregular surfaces as a whole, so that the rigidity of the side frames can be enhanced.

In the vehicle seat configured according to the aforementioned first aspect, an optional configuration may be such that the side frames comprise a flange portion disposed around a region thereof which leastwise includes a wall to which the operation unit is fixed, and configured to protrude in one of left and right directions that faces outward relative to the wall and to extend along upper and lower edges of the side frames, and a first gap portion disposed on the edges of the side frames around a region thereof at which the main body portion and the mount portion are joined together, and configured to be flush with the wall whereby a gap is formed in the flange portion; and wherein the operation unit is so disposed that at least a part thereof lies over the first gap portion.

With this configuration, the side frames can be made more compact in height in comparison with the configuration in which the operation unit is fixed in a position between the upper and lower flange portions. Furthermore, since the flange portion protruding relative to the wall to which the operation unit is fixed is provided in the side frames, the rigidity of the side frame can be enhanced.

In the above-described vehicle seat which includes a four-bar linkage, the main body portion has a recessed portion that is recessed in one of the left and right directions that faces inward, and the front link is joined to an inner side of a bottom wall of the recessed portion which inner side faces inward in one of the left and right directions.

With this configuration, the rigidity of the side frame can be enhanced. Moreover, the front link is joined to this rigidity-enhanced portion and thus the motion of the front link can be stabilized.

In the above-described vehicle seat which includes a four-bar linkage, the main body portion may comprise a flange portion disposed around a region thereof which leastwise includes a wall to which the operation unit is fixed, and configured to protrude in one of left and right directions that faces outward relative to the wall and to extend along upper and lower edges thereof, a second gap portion disposed on a part of the lower edge and configured to be flush with the wall to which the operation unit is fixed, whereby a gap is formed in the flange portion, and a recessed portion that is disposed opposite to the second gap portion and recessed in one of left and right directions that faces inward, and the vehicle seat may be configured such that the front link is joined to an inner side of a bottom wall of the recessed portion which inner side faces inward in one of left and right directions.

With this configuration, the side frames can be made more compact in height in comparison with the configuration in which no second gap portion is provided and the recessed portion is in a position closer to the flange portion. Furthermore, by providing the recessed portion, the rigidity of the side frame can be enhanced, and the motion of the front link can be stabilized.

In the above-described vehicle seat which includes a four-bar linkage, the main body portion may comprise a flange portion disposed around a region thereof which leastwise includes a wall to which the operation unit is fixed, and configured to protrude in one of left and right directions that faces outward relative to the wall and to extend along upper and lower edges thereof, a second gap portion disposed on a part of the lower edge and configured to be flush with the wall to which the operation unit is fixed, whereby a gap is formed in the flange portion, and a recessed portion at least part of which is disposed over the second gap portion and which is recessed in one of left and right directions that faces inward, and the vehicle seat may be configured such that the front link is joined to an inner side of a bottom wall of the recessed portion which inner side faces inward in one of left and right directions.

With this configuration, the recessed portion for connecting the front link is disposed over the second gap portion, and thus the side frames can be made more compact in height in comparison with the configuration in which the recessed portion is provided between the upper and lower flange portions. Furthermore, by providing the recessed portion, the rigidity of the side frame can be enhanced, and the motion of the front link can be stabilized.

In a second aspect of the present invention, a vehicle seat with a height adjustable seat bottom is disclosed. This vehicle seat comprises: left and right side frames each including a main body portion extending in a front-rear direction and a mount portion for a seat back frame, the mount portion protruding from a rear portion of the main body portion upward, the main body portion and the mount portion being integrally formed in one piece, the left and right side frames constituting left and right frames of the seat bottom; a height adjustment mechanism configured to allow the left and right side frames to be lifted and lowered; and an operation unit including an operation member configured to be caused to make a rotational motion which causes the height adjustment mechanism to be actuated, the operation unit being fixed to one of the left and right side frames, wherein a side frame for the operation unit to be attached thereto has a recessed portion that is recessed in one of left and right directions that faces inward, and the operation unit is attached to a bottom wall of the recessed portion.

With this configuration, the operation unit is attached to the bottom wall of the recessed portion of the side frame, and thus the amount of protrusion of the operation unit in one of the left and right directions that faces outward can be reduced, so that the seat bottom can be downsized in the left-right direction. Accordingly, the vehicle seat can be further improved in its compactness. Moreover, the side frame has the recessed portion, in other words, is provided with irregular surfaces as a whole, and thus the rigidity of the side frame can be enhanced.

In the above-described vehicle seat, an optional configuration may be such that the side frame for the operation unit to be attached thereto comprises a flange portion disposed around the bottom wall and configured to protrude in one of the left and right directions that faces outward relative to the bottom wall and to extend along upper and lower edges of the side frame, and a gap portion disposed on the edge of the side frame around a region thereof at which the main body portion and the mount portion are joined together, and configured to be flush with the bottom wall whereby a gap is formed in the flange portion, wherein the operation unit is disposed to face the gap portion.

With this configuration, the side frames can be made more compact in the upper-lower direction (i.e., made lower in profile) in comparison with the configuration in which the operation unit is in a position closer to the flange portion provided at the upper and lower edges. Accordingly, the vehicle seat can be further improved in compactness.

In the vehicle seat configured according to the second aspect described above, an optional configuration may be such that the side frame for the operation unit to be attached thereto comprises a flange portion disposed around the bottom wall and configured to protrude in one of the left and right directions that faces outward relative to the bottom wall and to extend along upper and lower edges of the side frame, and a gap portion disposed on the edge of the side frame around a region thereof at which the main body portion and the mount portion are joined together, and configured to be flush with the bottom wall whereby a gap is formed in the flange portion, wherein the operation unit is so disposed that at least a part thereof lies over the gap portion.

With this configuration, the side frame can be made lower in profile in comparison with the configuration in which the operation unit is in a position between the upper and lower flange portions. Accordingly, the vehicle seat can be further improved in compactness.

In each of the above-described vehicle seats, the height adjustment mechanism may comprise a four-bar linkage which includes: the respective side frames: left and right rear links rotatably joined to the rear portion of the main body portion: left and right front links rotatably joined to the main body portion at positions frontward of the rear links; and a link support member disposed below the side frames and configured to support the rear links and the front links in a manner that permits the front and rear links to rotate, wherein the rear links include a second gear which is in mesh with a first gear provided in the operation unit, and through which a rotational motion of the first gear is transmitted to thereby cause the four-bar linkage to be actuated, and wherein the side frames comprise a protective wall provided integrally therewith and configured to protrude from the bottom wall and to cover, from one of left and right directions that faces inward, a region in which the first gear and the second gear are in mesh with each other.

With this configuration, the protective wall which covers the region in which the first gear and the second gear are in mesh with each other serves to reduce the possibility of allowing an extraneous object to enter and get held between the first gear and the second gear. Moreover, as the protective wall is provided integrally with the side frames, any other part having the same function as that of the protective wall need not be attached to the side frames, and thus the number of parts can be reduced and the ease of the mounting operation can be improved.

In the above-described vehicle seat, the protective wall may preferably be formed to cover from above the region in which the first gear and the second gear are in mesh with each other.

With this configuration, the risk of allowing an extraneous object to enter and get held between the first gear and the second gear can be further reduced.

Each of the above-described vehicle seats may further comprise a reclining mechanism configured to make an angle of the seat back frame provided at the mount portion adjustable, and an operation lever provided on the side frame for the operation unit to be attached thereto to make the reclining mechanism operable, wherein the operation lever is disposed in such a position, at an outer side of the operation member which outer side faces outward in one of the left and right directions, that the operation member overlaps a rotary shaft of the operation member when viewed from the outer side facing in the one of the left and right directions.

With this configuration, the space at an inner side of the operation lever which inner side faces inward in one of the left and right directions can be utilized effectively, and thus the vehicle seat can be further improved in compactness.

In the above-described vehicle sheet, the operation unit may preferably be attached in a position adjacent to the reclining mechanism.

With this configuration, the operation unit and the reclining mechanism which are members with great rigidity are disposed in positions close to each other, and thus the side frames as a whole can be provided with improved rigidity. Furthermore, with this, stability of the height adjustment operation for the seat bottom and the angle adjustment operation for the seat back frame can be improved.

In each of the above-described vehicle seats, the side frames may comprise a reinforcing portion disposed around the bottom wall and configured to protrude in one of left and right directions that faces outward, and to extend along upper and lower edges of the side frames, the reinforcing portion having a U-shaped cross section.

With this configuration, the rigidity of the side frames can be further increased, in comparison with an configuration in which peripheral edge portions of the side frames are bent only once to the outer or inner side which faces outward or inward in one of the left and right directions. Moreover, with this, stability of the height adjustment operation for the seat bottom and the angle adjustment operation for the seat back frame can be improved.

In a third aspect of the present invention, a vehicle seat with a height adjustable seat bottom is disclosed. This vehicle seat comprises: left and right side frames each including a main body portion extending in a front-rear direction and a mount portion for a seat back frame, the mount portion protruding from a rear portion of the main body portion upward, the left and right side frames constituting left and right frames of the seat bottom; a height adjustment mechanism configured to allow the left and right side frames to be lifted and lowered; an operation unit including an operation member configured to be caused to make a rotational motion which causes the height adjustment mechanism to be actuated, the operation unit being fixed to one of the left and right side frames; and an occupant support member disposed between the main body portion of the left side frame and the main body portion of the right side frame and configured to support an occupant seated on the seat bottom, wherein a drive shaft of the operation unit is disposed rearward of the occupant support member.

With this configuration, as the drive shaft of the operation unit is disposed rearward of the occupant support member, a structure of the operation unit for actuating the height adjustment mechanism can be located far away from the seating portion of the seat bottom for an occupant to be seated thereon, and thus the feel of seating can be kept comfortable. Furthermore, the main body portions can be made more compact in the upper-lower direction (made lower in profile) in comparison with the configuration in which the drive shaft and the occupant support member are disposed one above the other, and thus compactness of the side frames in height can be achieved.

In the above-described vehicle seat, the operation unit in its entirety may be disposed rearward of the occupant support member.

With this configuration, the feel of seating can be kept more comfortable. Also, with this, if the operation unit is disposed to overlap the mount portion, the main body portion can be made still lower in profile, and thus the side frames can be made further more compact in height.

In each of the above-described vehicle seats, the occupant support member may comprise a seat spring which spans between the main body portions of the left and right side frames.

With this configuration, as overlapped area, in the front-rear direction, of the operation unit and the seat spring is made small, the flexibility of location of the seat spring can be improved. With this, the feel of seating can be made more comfortable.

In the above-described vehicle seat, each of the main body portions may include an engaging portion with which an end portion of the seat spring are engageable, wherein the operation unit as a whole is disposed rearward of the engaging portion.

With this configuration, as the operation unit and the engaging portion do not overlap in the front-rear direction, the flexibility of location of the engaging portion can be improved. With this, the feel of seating can be made more comfortable.

In the above-described vehicle seat, the operation unit may include a plate-like fixing portion configured to protrude radially outward, and the operation unit may be configured to be fixed to the side frame with the fixing portion being disposed to face the engaging portion.

With this configuration, the fixing portion which protrudes radially outward faces frontward, and thus the side frames can be made more compact in height in comparison with a configuration in which it is fixed with its fixing portion being so disposed as to face upward or downward.

In the above-described vehicle seat, the engaging portion may have a through hole for an end portion of the seat spring to be inserted therethrough, and the operation unit may be configured to have the fixing portion thereof fixed in a position adjacent to the engaging portion.

With this configuration, as the fixing portion is fixed near the through hole around which the rigidity of the side frame is lowered, the portion of the side frame around the to through hole have a double-wall structure composed of the side frame and the plate-like fixing portion: therefore, the rigidity of the frame of the seat bottom can be increased.

In each of the above-described vehicle seats, the operation unit may be so disposed that at least a part thereof lies over the mount portion.

With this configuration, as the operation unit is so disposed that at least a part thereof lies over the mount portion, the main body portion can be made lower in profile accordingly. Therefore, the side frames can be made compact in height.

Herein, in the third aspect as well, the operation member may, for example, be of a dial type or a lever type. If the lever-type operation member is adopted, such arrangement of the operation unit in the rear portion of the side frame that at least a part thereof lies over the mount portion increases the flexibility of arrangement/position of the portion of the lever to be operated by an occupant. This can improve the easy operability of the operation member.

In each of the above-described vehicle seats, a drive shaft of the operation unit may be disposed at a level higher than that of the occupant support member.

With this configuration, the operation unit can be located in a position closer to the front side in comparison with a configuration in which the operation unit is disposed directly rearward of the occupant support member, and thus the side frames can be made compact in the front-rear direction.

The above-described vehicle seat in which the main body portion includes an engaging portion may be configured to further comprise a reclining mechanism configured to make an angle of the seat back frame provided at the mount portion adjustable, wherein the operation unit is disposed on a line connecting a center of rotation of the reclining mechanism and a rear end of the engaging portion as seen from a left or right direction.

With this configuration, the reclining mechanism, the operation unit and the occupant support member can be arranged in a straight line, and thus the side frames can be made compact in height.

In a fourth aspect of the present invention, a vehicle seat with a height adjustable seat bottom is disclosed. This vehicle seat comprises: left and right side frames constituting left and right frames of the seat bottom, a height adjustment mechanism configured to allow the left and right side frames to be lifted and lowered: and an operation unit including an operation member configured to be caused to make a rotational motion which causes the height adjustment mechanism to be actuated to thereby adjust the height of the left and right side frames, wherein the operation unit is fixed to the side frame by welding.

With this configuration, as the operation unit is fixed to the side frame by welding, the operation unit can be fixed more securely in comparison with a conventional configuration in which the operation unit is fixed to the side frame by a pin. Accordingly, the impact resistance of the operation unit can be increased.

In the above-described vehicle seat, the operation unit may preferably include a plate-like fixing portion protruding radially outward wherein the fixing portion is welded to the side frame.

With this configuration, the operation unit and the side frame can be welded in a position remote from the operation member that is a movably (rotatably) configured portion, and thus the detrimental effects of sputter and heat produced during the welding process can be suppressed.

In the above-described vehicle seat, the fixing portion may be configured to include at least two parts of which one part of the fixing portion protrudes in a direction opposite to that in which the other part of the fixing portion protrudes, symmetrically with respect to the rotary shaft of the operation member.

With this configuration, the fixing strength for the operation unit fixed to the side frame is improved, and thus the operation unit can be fixed more stably.

In the above-described vehicle seat with the operation unit including the fixing portion, the operation unit may be configured such that the fixing portion is fixed in a position adjacent to a through hole provided in the side frame.

With this configuration, as the fixing portion is fixed near the through hole around which the rigidity of the side frame is lowered, the portion of the side frame around the through hole have a double-wall structure composed of the side frame and the plate-like fixing portion; therefore, the rigidity of the frame of the seat bottom can be increased.

The above-described vehicle seat with the operation unit including the fixing portion may be configured such that the operation unit includes a first gear configured to be caused to rotate by an operation of the operation member; wherein the height adjustment mechanism includes a second gear which is in mesh with the first gear, and through which a rotational motion of the first gear is transmitted to thereby cause the left and right side frames to be lifted and lowered; wherein the side frame and the fixing portion each have a through hole for locating the fixing portion in place relative to the side frame; and wherein the through hole of one of the side frame and the fixing portion is larger than the through hole of the other of the side frame and the fixing portion.

With this configuration, fixing of the operation unit to the side frame can be realized by inserting a pin through the through holes of the side frame and the fixing portion to tentatively retain the operation unit at the side frame, and welding the fixing portion to the side frame while pressing the first gear against the second gear to fix the operation unit to the side frame. By such fixing, a gap between teeth of the first and second gears can be narrowed, and thus a rattle of the first and second gears can be suppressed; in particular, sinking of the seat bottom which would occur when an impact is imparted can be suppressed.

The above-described vehicle seat with the operation unit including the fixing portion may be configured to comprise a reclining mechanism configured to make an angle of the seat back frame provided at a rear portion of the side frame adjustable, wherein an outermost protruding end portion of the fixing portion is disposed above or below a line connecting a center of rotation of the reclining mechanism and a center of rotation of the operation member as seen from a left or right direction.

With this configuration, the reclining mechanism and the operation unit can be arranged in positions closer to each other, and thus the side frame can be made more compact in size.

The above-described vehicle seat with the operation unit including the fixing portion may be configured such that each of the side frames includes an engaging portion with which an end portion of an occupant support member disposed between the left and right side frames and configured to support an occupant seated on the seat bottom is engageable, wherein an outermost protruding end portion of the fixing portion is disposed above or below a line connecting a rear end of the engaging portion and a center of rotation of the operation member as seen from a left or right direction.

With this configuration, the engaging portion and the operation unit can be arranged in positions closer to each other, and thus the side frames can be made more compact in size.

The above-described vehicle seat with at least two parts provided therein as the fixing portion may be configured to comprise a reclining mechanism configured to make an angle of the seat back frame provided at a rear portion of the side frame adjustable, wherein each of the side frames includes an engaging portion with which an end portion of an occupant support member disposed between the left and right side frames and configured to support an occupant seated on the seat bottom is engageable, wherein an outermost protruding end portion of the one part of the fixing portion is disposed below a line connecting a center of rotation of the reclining mechanism and a center of rotation of the operation member as seen from the left or right direction, and wherein an outermost protruding end portion of the other part of the fixing portion is disposed above a line connecting a rear end of the engaging portion and the center of rotation of the operation member as seen from the left or right direction.

With this configuration, the reclining mechanism, the operation unit and the engaging portion can be arranged in positions closer to one another in the upper-lower direction, and thus the side frames can be made compact in the upper-lower direction.

The above-described vehicle seat with at least two parts provided therein as the fixing portion may be configured to comprise a reclining mechanism configured to make an angle of the seat back frame provided at a rear portion of the side frame adjustable, wherein each of the side frames includes an engaging portion with which an end portion of an occupant support member disposed between the left and right side frames and configured to support an occupant seated on the seat bottom is engageable, wherein an outermost protruding end portion of the one part of the fixing portion is disposed above a line connecting a center of rotation of the reclining mechanism and a center of rotation of the operation member as seen from the left or right direction, and wherein an outermost protruding end portion of the other part of the fixing portion is disposed below a line connecting a rear end of the engaging portion and the center of rotation of the operation member as seen from the left or right direction.

With this configuration, the reclining mechanism, the operation unit and the engaging portion can be arranged in positions closer to one another in the front-rear direction, and thus the side frames can be made compact in the front-rear direction.

A method for manufacturing a vehicle seat, which relates to the fourth aspect of the present invention, is disclosed. This manufacturing method is a method for manufacturing a vehicle seat which comprises: left and right side frames constituting left and right frames of a seat bottom: a height adjustment mechanism configured to allow the left and right side frames to be lifted and lowered; and an operation unit including an operation member configured to be caused to make a rotational motion which causes the height adjustment mechanism to be actuated to thereby adjust the height of the seat bottom, a plate-like fixing portion protruding radially outward, and a first gear configured to be caused to rotate by an operation of the operation member, wherein the height adjustment mechanism includes a second gear which is in mesh with the first gear, and through which a rotational motion of the first gear is transmitted to thereby cause the left and right side frames to be lifted and lowered: wherein the side frame and the fixing portion each have a through hole for locating the fixing portion in place relative to the side frame: and wherein the through hole of one of the side frame and the fixing portion is larger than the through hole of the other of the side frame and the fixing portion, the method comprising: a tentative retention step of tentatively retaining the operation unit at the side frame by inserting a pin through the through holes of the side frame and the fixing portion; and a fixing step of fixing the operation unit to the side frame by welding the fixing portion to the side frame while pressing the first gear against the second gear.

With this manufacturing method, the operation unit is fixed to the side frame by welding, and thus the operation unit can be fixed firmly to the side frame. Moreover, a gap between the teeth of the first gear and the teeth of the second gear can be narrowed, and thus a rattle of the first and second gears can be suppressed; in particular, sinking of the seat bottom which would occur when an impact is imparted can be suppressed.

In a fifth aspect of the present invention, a vehicle seat with a height adjustable seat bottom, particularly in which an operation unit and a detection sensor are both provided, is disclosed. This vehicle seat comprises: left and right side frames constituting left and right frames of the seat bottom; a height adjustment mechanism configured to allow the left and right side frames to be lifted and lowered; an operation unit including an operation member configured to be caused to make a rotational motion which causes the height adjustment mechanism to be actuated to thereby adjust height of the left and right side frames, the operation unit being fixed to one of the left and right side frames; and a detection sensor including a detection part in which a state of the seat bottom is detectable, wherein a rotary shaft of the operation member and the detection part are disposed in positions shifted from each other in at least one of front-rear and upper-lower directions; and wherein the operation unit and the detection sensor are disposed in positions such that at least a part of one lies over the other in a left-right direction.

With this configuration, as the rotary shaft of the operation member and the detection sensor are disposed in positions shifted from each other in at least one of front-rear and upper-lower directions, interference between the operation member (operation unit) and the detection part (detection sensor) can be suppressed. Moreover, as the operation unit and the detection sensor are disposed in positions such that at least a part of one lies over the other in the left-right direction, the vehicle seat can be made more compact in the left-right direction in comparison with a configuration in which the whole operation unit and the whole detection sensor are positioned so as not to overlap each other in the left-right direction.

In the above-described vehicle seat, the height adjustment mechanism may comprise a linkage which includes: the respective left and right side frames; a pair of front and rear links rotatably joined to each of the side frames; and a link support member disposed below the side frames and configured to support the pair of links in a manner that permits the links to rotate, wherein the detection sensor is arranged on an axis of rotation of the link on which the link is rotatable relative to the side frame or the link support member.

With this configuration, the vehicle seat can be made more compact in the upper-lower direction as well, in comparison with a configuration in which the detection sensor is disposed below the links.

In the above-described vehicle seat, the detection sensor may be provided in joint shafts by which the links are rotatably supported on the side frames or the link support member.

With this configuration, the detection sensor can be incorporated in the linkage that is a known height adjustment mechanism, and thus interference between the detection sensor and the links can be suppressed; further, as no space for suppressing interference is required, the vehicle seat can be made more compact. Moreover, as the detection sensor is used as the joint shaft, the number of parts in the vehicle seat can be reduced.

In the above-described vehicle seat, the rotary shaft of the operation member may be disposed between two nodes of one link rotatably supported by the detection sensor, and above the detection part in the front-rear direction, at least when the seat bottom is in the lowest position.

With this configuration, interference between the rotary shaft of the operation unit and the links can be suppressed when the seat bottom is in the lowest position, whereas the side frames can be reduced in size in the front-rear direction. Accordingly, the vehicle seat can be made more compact in the front-rear direction.

In each of the above described vehicle seats with the detection sensor provided in the joint shafts, the detection sensor may be configured as a joint shaft between the farther link that is one of the front and rear links disposed farther from the operation unit in the front-rear direction and the side frame to which the operation unit is fixed.

With this configuration, both of the operation unit and the detection sensor can be provided in one side frame without making the side frame larger in size. Moreover, the operation unit and the detection sensor are disposed in positions separate from each other in the front-rear direction at one side frame, and thus the operation unit and the detection sensor can be mounted to the side frame with increased ease.

In the vehicle seat with the detection sensor provided in the joint shafts, the joint shafts in which the detection sensor is provided may be the joint shafts by which the links and the link support member are joined, wherein the detection sensor includes a protruding portion which protrudes from the detection part toward a left or right direction; and wherein a lower portion of the side frame has a recess provided to receive at least a part of the protruding portion of the detection sensor when the seat bottom is in a lowest position.

With this configuration, as interference between the side frame and the detection sensor can be suppressed by the recess provided on the lower portion of the side frame, the height measured when the seat bottom is in the lowest position can be made lower. Accordingly, the vehicle seat, particularly, when the seat bottom is in the lowest position, can be made more compact in height (the upper-lower direction).

In the above-described vehicle seat with the detection sensor provided in the joint shafts, the detection sensor may be provided in a joint shaft by which the link and the side frame to which the operation unit is fixed are rotatably joined, wherein each of the detection sensor and the operation unit includes a protruding portion which protrudes from the side frame toward a left or right direction, wherein the protruding portion of the operation unit is disposed at an outer side that is one of the left or right side of the side frame, and the protruding portion of the detection sensor is disposed at an inner side that is one of the left or right side of the side frame.

With this configuration, interference between the operation unit and the detection sensor can be suppressed. Moreover, parts of the operation unit and the detection sensor can be so positioned as to overlap each other as viewed from the left or right direction, and thus the side frame can be downsized, so that the vehicle seat can be more compact.

Each of the above-described vehicle seats with the detection sensor provided in the joint shafts may be configured to further comprise a connecting member which extends from one side frame to the other side frame to connect the left and right links, which connecting member is attached to the links in a position avoiding the detection sensor.

With this configuration, interference between the detection sensor and the connecting member can be suppressed.

Each of the above-described vehicle seats with the detection sensor provided in the joint shafts may be configured to further comprise a pipe-like connecting member which extends from one side frame to the other side frame to connect the left and right links, and at least a part of the detection sensor is disposed at an inner side relative to the connecting member.

With this configuration, as the detection sensor is disposed at the inner side relative to the pipe-like connecting sensor, the links can be downsized, and thus the vehicle seat can be made more compact. Moreover, the connecting member can be configured to serve to protect the detection sensor.

In each of the above-described vehicle seats with the detection sensor provided in the joint shafts, the link may be configured to be provided rotatably on the detection part.

With this configuration, even when the linkage is actuated, the position of the detection part will never change, and thus detection of the state of the seat bottom can be done under the same conditions irrespective of the height position of the seat bottom. Accordingly, control exercised based upon the detection results of the detection sensor can be made more precise.

BRIEF DESCRIPTION OF DRAWINGS

FIG. 5 includes views (a) and (b) for explaining connection of a front link and the connecting pipe.

FIG. 6 includes views (a) and (b) for explaining fixing of the operation unit.

FIG. 7 is a view for explaining height adjustment of a seat bottom, in which (a) shows the seat bottom in the lowest position, and (b) shows the seat bottom in the highest position.

FIG. 16 includes a side elevation (a) of a car seat according to a fourth embodiment as viewed from an outer side, and a side elevation (b) of a car seat according to another example of the fourth embodiment as viewed from an outer side.

DESCRIPTION OF EMBODIMENTS

Next, a detailed description will be given of various embodiments of the present invention with reference made to the drawings where appropriate. It is to be understood that the front/rear, left/right (lateral) and upper/lower (upward/downward) used in describing the present invention are defined as viewed from an occupant sitting on the seat.

First Embodiment

Figure 1:
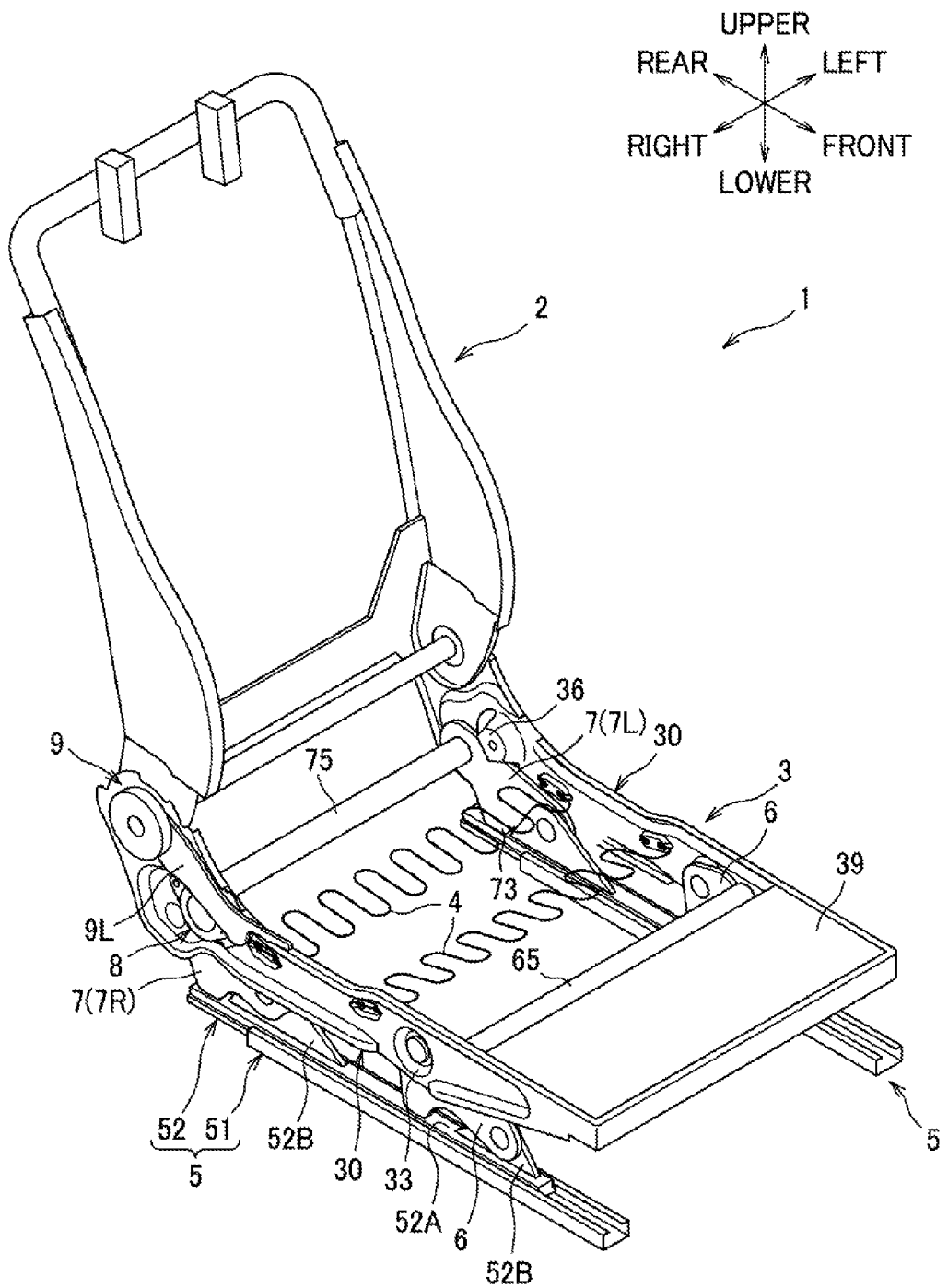
FIG. 1 is a perspective view of a car seat according to a first embodiment of the present invention.

As shown in FIG. 1, a car seat 1 as an example of a vehicle seat is configured such that a height of a seat bottom for an occupant to sit thereon is adjustable, and mainly includes a seat back frame 2 which constitutes a frame of a seat back, a seat bottom frame 3 which constitutes a frame of the seat bottom, seat springs 4 as an occupant support member, slide rails 5 as a link support member, front links 6, rear links 7 and an operation unit 8.

This car seat 1 is composed of the seat back frame 2 and the seat bottom frame 3 the outsides of which are covered with a seat cushion (not shown) made of urethane foam or the like.

The seat bottom frame 3 mainly includes substantially sheet-like left and right side frames 30 which constitute left and right frames of the seat bottom, and a pan frame 39 which connects the front portions of the left and right side frames 30. Each of the side frames 30 and the pan frame 39 are made, respectively, of stamped or otherwise formed sheet metal.

In the present embodiment, the side frames 30 provided in pair are formed in bilateral symmetry so that the operation unit 8 can be attached to either of the left and right side frames 30. However, the present invention is not limited to this configuration; the right side frame 30 to which the operation unit 8 is fixed and the left side frame 30 to which the operation unit 8 is not fixed may be different in shape from each other. To be more specific, for example, the left side frame 30 may be configured to have no protective wall 36 which will be described later.

Figure 2:
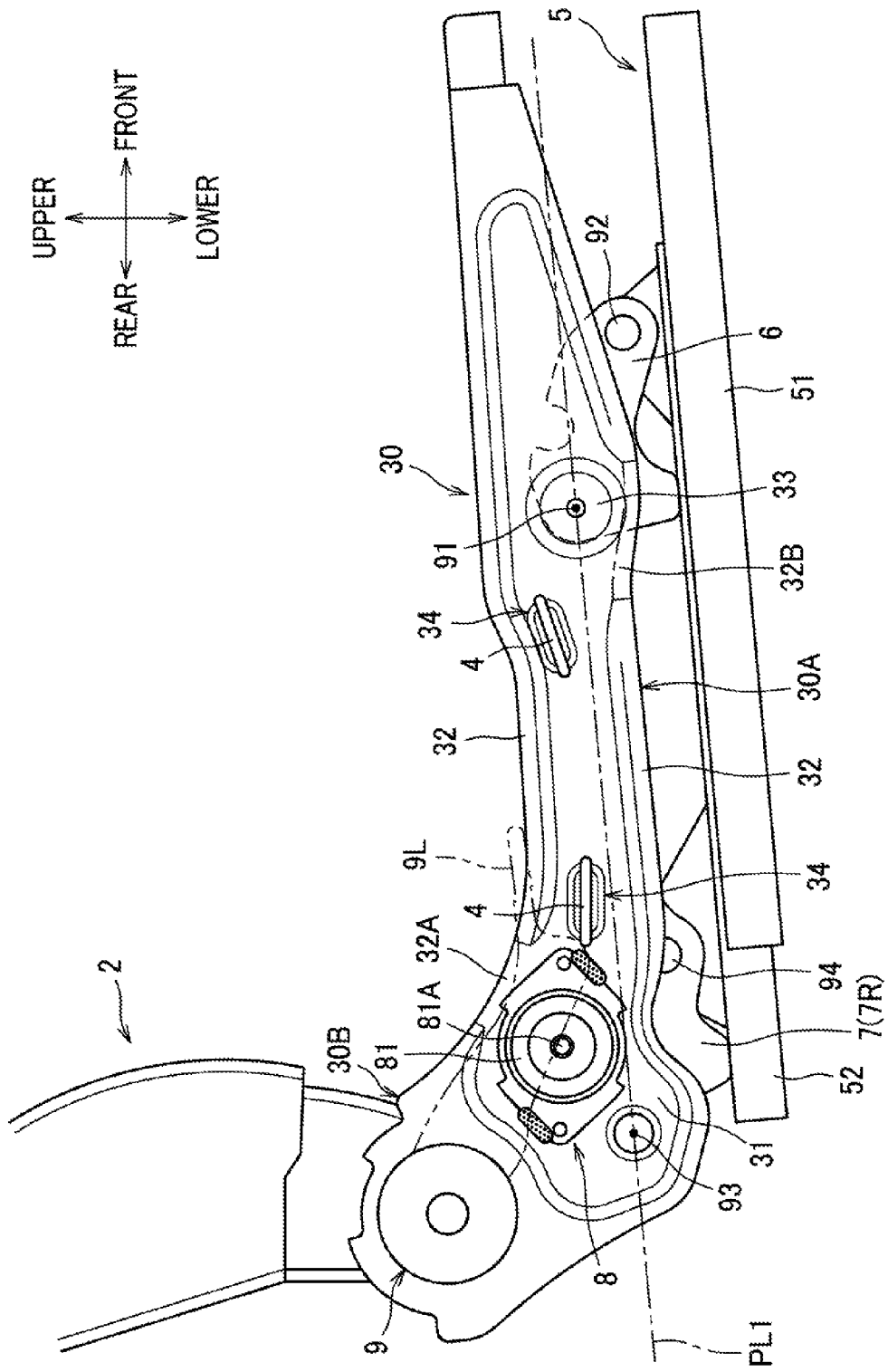
FIG. 2 is a side elevation of a portion, including a right side frame, of the car seat according to the first embodiment, as viewed from an outer side.

As shown in FIG. 2, each side frame 30 mainly includes a main body portion 30A extending generally in a front-rear direction, and a mount portion 30B protruding from a rear portion of the main body portion 30A in an obliquely rearward and upward direction. In the present embodiment, the side frame 30 is formed with the main body portion 30A and the mount portion 30B formed integrally (in a single part).

At the mount portion 30B, a known reclining mechanism 9 for use in making an adjustment to an angle of the seat back frame 2 is provided, and the seat back frame 2 is attached to the mount portion 30B (rear portion of the seat bottom frame 3) via the reclining mechanism 9.

In the present embodiment, the side frame 30 has irregular surfaces as a whole. To be more specific, the side frame 30 includes a fixing wall 31 for the operation unit 8 to be fixed thereto, flange portions 32 provided as a reinforcing portion around the fixing wall 31, and a link mount recess portion 33 as one example of a recessed portion.

The fixing wall 31 is configured to extend substantially along the front-rear direction from a front portion of the main body portion 30A toward the rear end of the main body portion 30A, and has its rear portion shaped to protrude upward so as to overlap a lower portion of the mount portion 30B. This fixing wall 31 mainly includes engaging portions 34, positioning holes 35 (see FIG. 3), and a protective wall 36 (see FIG. 4).

The flange portions 32 are provided around the fixing wall 31 so as to protrude relative to the fixing wall 31 in one of the left and right directions that faces outward, and to extend along upper and lower edges of the side frame 30. Each of the upper and lower flange portions 32 is configured to have a substantially U-shaped cross section (see FIG. 5(a)).

In the present embodiment, the flange portions 32 provided at the upper and lower edges of the side frame 30, the front end portion of the side frame 30 (main body portion 30A), and a rear end portion of the side frame 30 (including an upper portion of the mount portion 30B) form a flush and continuous surface (except a gap portion which will be described later). Accordingly, the reclining mechanism 9 is attached to a surface which protrudes in one of the left and right directions that faces outward relative to the fixing wall 31 to which the operation unit 8 is fixed.

The flange portions 32 are provided with an upper gap portion 32A as one example of a first gap portion and a lower gap portion 32B as one example of a second gap portion, wherein the upper gap portion 32A is a partially cut away portion in the flange portion 32 disposed on the upper edge of the side frame 30 around a region thereof at which the main body portion 30A and the mount portion 30B are joined together, and the lower gap portion 32B is a partially cut away portion in the flange portion 32 disposed on the lower edge of the main body portion 30A in a region positioned slightly closer to a front side from the center in the front-rear direction. The upper gap portion 32B and the lower gap portion 32B are configured to be flush with the fixing wall 31.

The link mount recess portion 33 is a recessed portion which is provided in a region positioned slightly closer to the front side from the center in the front-rear direction of the main body portion 30A, and configured to be recessed relative to the fixing wall 31 toward an inner side that is one of the left and right directions that faces inward. This link mount recess portion 33 is shaped substantially like a circle in side view, and provided to have a part thereof laid over the lower gap portion 32B. Accordingly, the side frames 30 (main body portions 30A) can be made more compact in height, for example, in comparison with a configuration in which the link mount recess portion 33 is provided between the upper and lower flange portions 32 having no lower gap portion 32B.

The front link 6 is joined to an inner side of a bottom wall of the link mount recess portion which inner side faces inward in one of the left and right directions.

As described above, as the side frame 30 as a whole has irregular surfaces, the rigidity of the side frame 30 can be enhanced. Moreover, in this embodiment, the flange portion 32 has a substantially U-shaped cross section, and thus the rigidity of the side frame 30 can be enhanced more, for example in comparison with a configuration in which the peripheries of the side frame 30 are bent only once in one of the left and right directions that faces outward.

Since the front link 6 is joined to the bottom wall of the link mount recess portion 33 of the side frame 30 of which the rigidity is enhanced, the motion of the front link 6 can be stabilized. The same can be said to apply to the rear links 7 and the reclining mechanism 9, and thus the height adjustment operation for the seat bottom and the angle adjustment operation for the seat back frame 2, which will be described later, can be made more stable.

Next, a detailed description will be given of the engaging portions 34, the positioning holes 35 and the protective wall 36, which are provided in the fixing wall 31.

Figure 3:
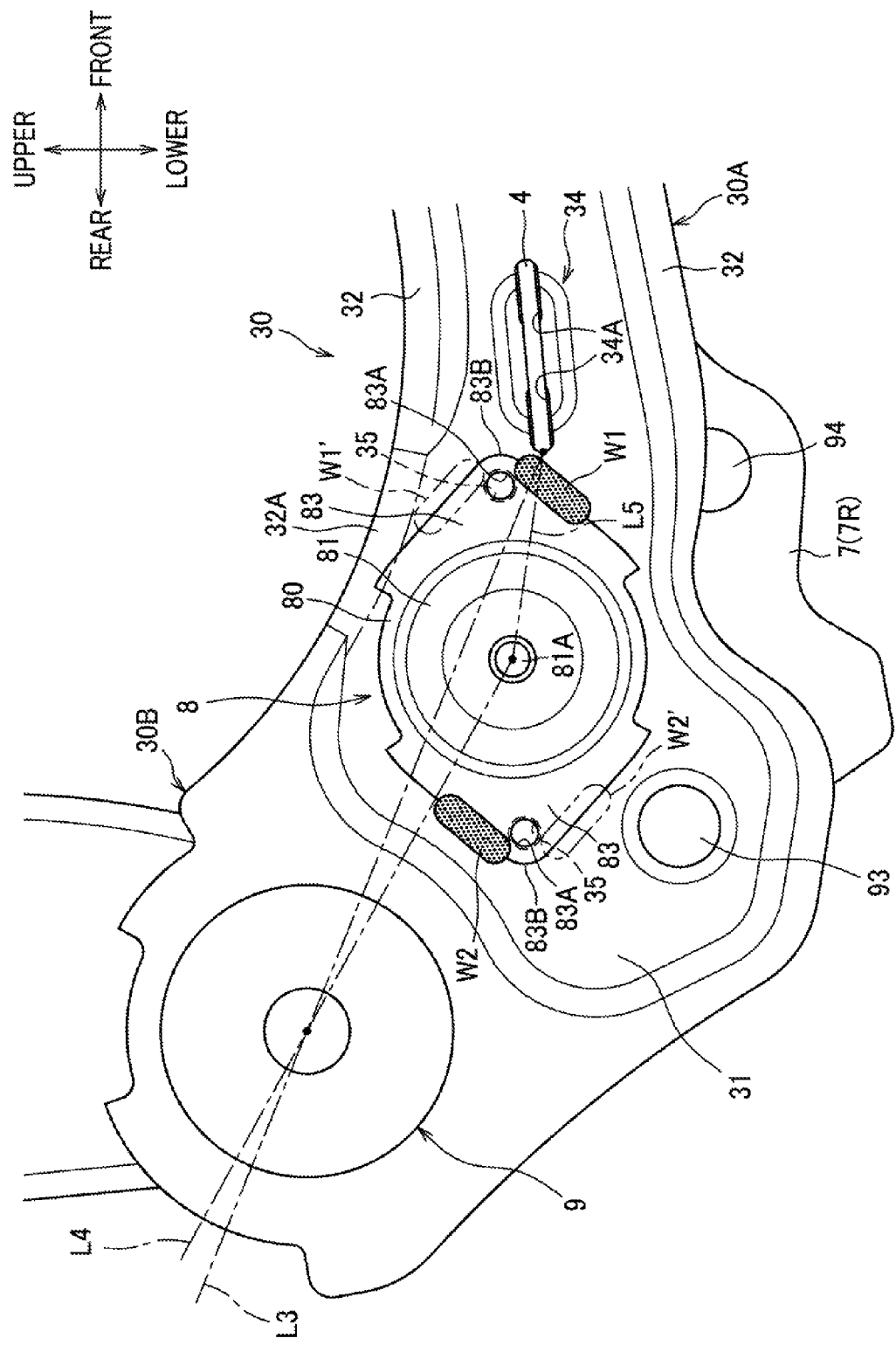
FIG. 3 is an enlarged view of an operation unit and therearound.

The engaging portions 34 are structures for attaching the seat springs 4 to the side frames 30, one engaging portion 34 is provided at a position below a front end portion of the upper gap portion 32A and one engaging portion 34 is provided above a rear end portion of the lower gap portion 32B of the fixing wall 31 (main body portion 30A). As shown in FIG. 3, the engaging portion 34 is formed in a recessed shape recessed relative to the fixing wall 31 in one of the left and right direction that faces inward (see also FIG. 6(a)), and a bottom portion thereof has two through holes 34A. The seat spring 4 is engaged with the engaging portion 34 with an end portion of the seat spring 4 inserted in the through holes 34A.

The positioning holes 35 are through holes each having a substantially circular shape in side view, for locating the operation unit 8 in place relative to the side frame 30. Two positioning holes 35 are provided in a rear portion of the fixing wall 31, more specifically, rearward of the rear-side engaging portion 34. A detailed description of the positioning holes 35 will be given later.

Figure 4:
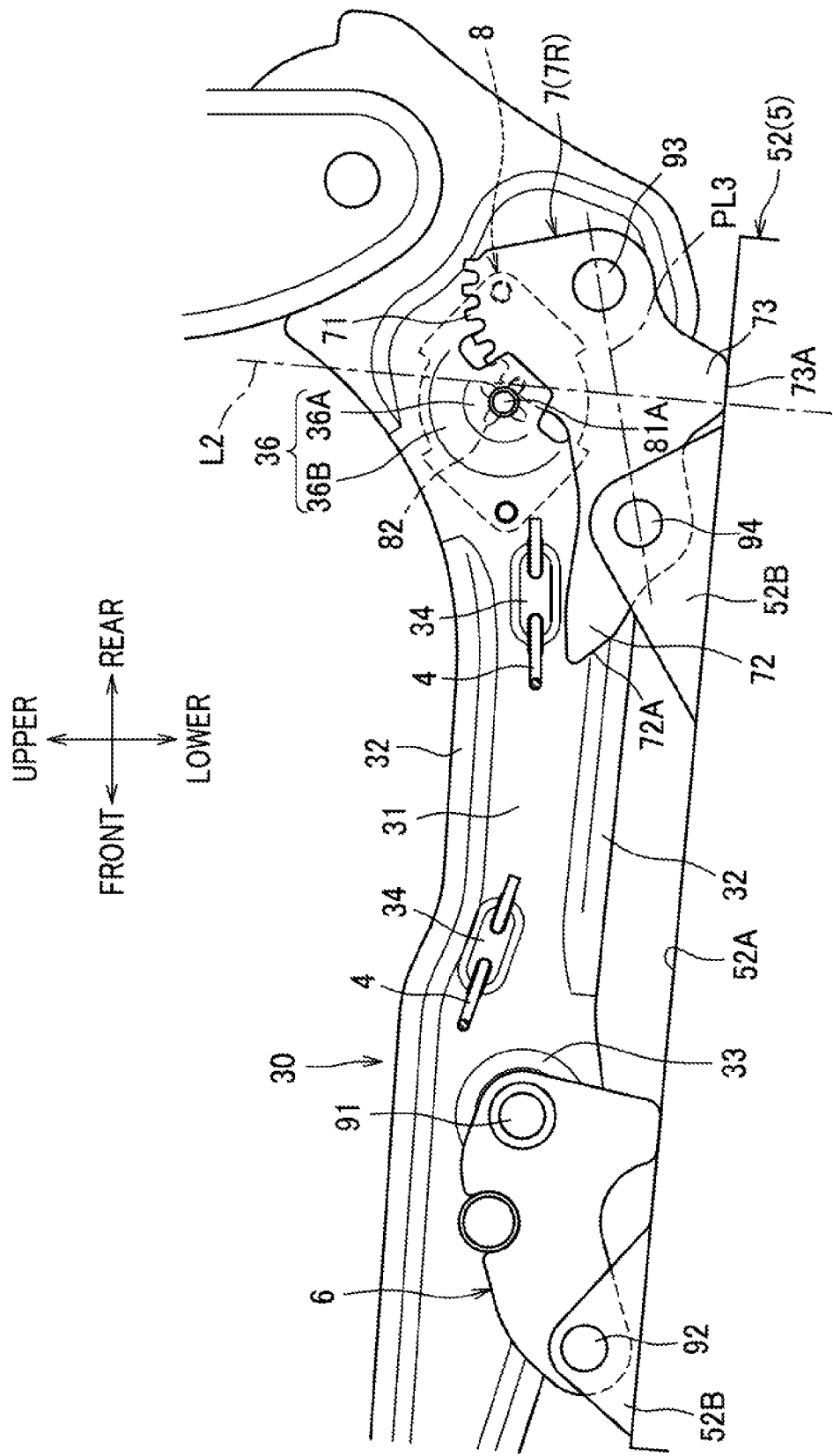
FIG. 4 is a side elevation of a portion, including the right side frame, of the car seat according to the first embodiment, as viewed from an inner side.

As shown in FIG. 4, the protective wall 36 is a generally cup-like portion extending from a rear portion of the fixing wall 31 (a position rearward of the rear-side engaging portion 34) toward an inner side that faces in one of the left and right directions, and provided integrally with the fixing wall 31. This protective wall 36A includes a bottom wall portion 36A substantially parallel to the fixing wall 31, and a connecting wall portion 36B connecting the fixing wall 31 and the bottom wall portion 36A.

The bottom wall portion 36A is formed to cover, from an inner side that faces in one of the left and right direction, a pinion gear in its entirety as one example of a first gear and a region in which the pinion gear 82 and a sector gear 71 as one example of a second gear are in mesh with each other, which gears will be described later. The connecting wall portion 36B is formed around the peripheral edge of the pinion gear 82 to cover a region from an obliquely rear and upper side to an obliquely front and lower side of the pinion gear 82. Accordingly, the region in which the pinion gear 82 and the sector gear 71 are in mesh with each other is covered thereby from above.

Since the region in which the pinion gear 82 and the sector gear 71 are in mesh with each other is covered with the protective wall 36 as described above, the risk of allowing an extraneous object to enter and get held between the pinion gear 82 and the sector gear 71 can be reduced. Particularly, in this embodiment, as the meshing region is covered from above, an extraneous matter is made unlikely to drop to the teeth of the pinion gear 82 and the sector gear 71, and thus an extraneous object can be prevented from entering and getting held therebetween without fail.

Moreover, in the present embodiment, as the protective wall 36 is provided integrally with the side frame 30, any other part having the same function as that of the protective wall 36 need not be attached to the side frame 30, and thus the number of parts can be reduced and the ease of mounting operation can be improved.

As shown in FIG. 1, the seat springs 4 are members configured to support an occupant sitting on the seat bottom, and disposed between the left and right side frames 30 (main body portions 30A thereof). To be more specific, in the present embodiment, each seat spring 4 has one end portion engaged with the engaging portion 34 of one side frame 30 and the other end portion engaged with the engaging portion 34 of the other side frame 30, so that the seat spring 4 spans between the main body portions 30A of the left and right side frames 30.

The slide rails 5 are known structures for allowing the seat bottom frame 3 (seat bottom) to move frontward and rearward, and are disposed under the side frames 30 (seat bottom frame 3). Each of these side rails 5 mainly includes a lower rail 51 and an upper rail 52.

Two lower rails 51 each having an elongate shape extending in the front-rear direction are provided at the left and at the right, apart from each other with a gap provided therebetween. Each lower rail 51 is fixed to the floor of the car (vehicle).

The upper rails 52 each having an elongate shape extending in the front-rear direction are engaged with the lower rails 51, slidably frontward and rearward. At an upper end of each upper rail 52, a flat-shaped to-be-contacted surface 52A extends generally in the front-rear direction and a link support portion 52B having a generally triangular shape in side view are provided, so that stopper portions 62, 72, 73 (which will be described later) of the front link 6 and the rear link 7 come in contact with the to-be-contacted surface 52A, and the front link 6 and the rear link 7 are rotatably supported by the link support portion 52B.

The upper rail 52 are connected with the seat bottom frame 3 via the front link 6 and the rear link 7, whereby the seat bottom is allowed to slide frontward and rearward relative to the floor of the car to which the lower rail 51 is fixed.

As shown in FIG. 4, the front link 6 and the rear link 7 are rotatably connected to the side frame 30 and to the upper rail 52 (slide rail 5), to thereby constitute a four-bar linkage as a height adjustment mechanism in combination with the side frame 30 and the slide rail 5. With this four-bar linkage, the left and right side frames 30 (seat bottom) is allowed to be lifted or lowered relative to the slide rails 5 (floor of the car).

To be more specific, the front links 6 are provided one at the left and one at the right (only one is illustrated), and a rear end portion (disposed at the rear side in the drawing) of each front link 6 is joined to the bottom wall of the link mount recess portion 33 so that a node is formed at a front point of the side frame 30 (main body portion 30A). A pin 91 is provided by which the front link 6 is rotatably supported, so that the front link 6 can be rotated relative to the side frame 30.

A front end portion (disposed at the front side in the drawing) of each front link 6 is joined to the front link support portion 52B of the upper rail 52 via a pin 92 so that a node is formed at the front link support portion 52B. The pin 92 is provided by which the front link 6 is rotatably supported, so that the front link 6 can be rotated relative to the slide rail 5.

As shown in FIG. 5 (a), (b), each front link 6 has a recessed portion 61 and a stopper portion 62 provided integrally at an outer periphery thereof.

The recessed portion 61 provides a recess engageable with an end portion of a connecting pipe 65 as a connecting member, and is generally in the form of a segment of a circle as viewed from the left-right direction. The left and right front links 6 are welded to the generally cylindrical end portions of the connecting pipe 65 engaged with the recessed portions 61 of the front links 6, and thereby connected together by the connecting pipe 65 extending from one side frame 30 to the other side frame 30. In the drawings of the present application, welds are indicated by shading with dot pattern.

With the above-described connecting configuration, the connecting pipe 65 can be placed in the recessed portions 61 provided on the outer peripheries of the front links 6 before being attached thereto, and thus the ease of the mounting operation for the front links 6 and the connecting pipe 65 can be improved. In particular, in the present embodiment, as the substantially cylindrical connecting pipe 65 is engaged with the recessed portions 61 shaped like a segment of a circle in side view, positioning of the connecting pipe 65 with the front links 6 can be made easier, so that the ease of the mounting operation can be further improved.

Furthermore, since the connecting pipe 65 can be placed in the recessed portions 61, the order of assembly of the front links 6 and the connecting pipe 65 in the assembly process of the car seat 1 is made more flexible, and thus the operational ease of the assembly process can be improved.

Hereafter, the recessed portion 61 will be described more in detail.

When the front link 6 is positioned as shown in FIG. 5(*b*), the recessed portion 61 opens upward at the upper side of the outer periphery of the front link 6. To be more specific, the recessed portion 61 is disposed on the outer periphery of the front link 6 between a pin 91 that is a side frame 30 side rotary shaft of the front link 6 and a pin 92 that is a slide rail 5 side rotary shaft of the front link 6, and formed so as to open to a space above a plane PL2 connecting a side frame 30 side center of rotation and a slide rail 5 side center of rotation of the left and right front links 6.

With this configuration, the connecting pipe 65 can be placed in the recessed portion 61, and thus the ease of the mounting operation for the front links 6 and the connecting pipe 65 can be improved further without fail. Moreover, as the recessed portion 61 is formed between the pins 91, 92, provision of a portion which, for example, protrudes rearward beyond the pin 91 in the front link 6 which would be required for providing the recessed portion 61 is not required; therefore, the front link 6 can be downsized and/or its configuration can be simplified.

Furthermore, the recessed portion 61 has its open edges 61A formed to broaden out toward the ends, wider than its engageable portion with which the connecting pipe 65 is fitted. This makes it easy for the connecting pipe 65 to be fitted into the recessed portion 61, so that the operational ease of assembly process for the front links 6 and the connecting pipe 65 can be improved.

In the present embodiment, the connecting pipe 65 is welded on the inner peripheral wall of the recessed portion 61. Accordingly, the connection between the connecting pipe 65 and a pair of the left and right front links 6 which are integrated in one piece by welding can be enhanced in strength; therefore, even when change is effected in the direction of the load imposed on the front links 6 according to the actuation of the four-bar linkage, the change is made more unlikely to have adverse effects.

If the connecting pipe 65 having a substantially cylindrical shape and the recessed portion 61 generally having a shape of a segment of a circle in side view are welded along an entire range of their engagement, the connecting pipe 65 and a pair of the left and the right front links 6 can, more preferably, be connected more securely.

The stopper portion 62 is a portion configured to come in contact with the to-be-contacted surface 52A of the upper rail 52 so as to restrict actuation of the four-bar linkage in conjunction with the second stopper portion 73 (that will be described later) of the rear link 7. This stopper portion 62 is disposed on the outer periphery of the front link 6, opposite (across the plane PL2) to the recessed portion 61 which is provided on the upper side in the drawing, that is, on the lower side in the drawing with respect to the plane PL2; to be more specific, the stopper portion 62 is disposed to protrude downward in a position below the pin 91 when the front link 6 is positioned as shown in FIG. 5(*b*).

Since the stopper portion 62 and the recessed portion 61 are disposed remote from each other as described above, the effects of a load, imposed when the stopper portion 62 comes in contact with the to-be-contacted surface 52A, on the connecting pipe 65 engaged with the recessed portion 61 can be reduced. Accordingly, deformation or the like of the connecting pipe 65 can be suppressed.

As shown in FIG. 4, the rear links 7 are provided one at the left and one at the right (only one is illustrated), and a rear end portion (disposed at the rear side in the drawing) of each rear link 7 is joined via a pin 93 to an inner side of the fixing wall 31 which faces inward in the left-right direction so that a node is formed at a rear point of the side frame 30 (main body portion 30A). The pin 93 is provided by which the rear link 7 is rotatably supported, so that the rear link 7 can be rotated relative to the side frame 30.

A front end portion (disposed at the front side in the drawing) of each rear link 7 is joined to the rear link support portion 52B of the upper rail 52 via a pin 94 so that a node is formed at the rear link support portion 52B. The pin 94 is provided by which the rear link 7 is rotatably supported, so that the rear link 7 can be rotated relative to the slide rail 5.

At an outer periphery of the right rear link 7R, the sector gear 71 and the stopper portions (first stopper portion 72 and second stopper portion 73) are formed integrally in one piece. In the present embodiment, at an outer periphery of the left rear link 7L, the sector gear 71 and the first stopper portion 72 are not provided, but the second stopper portion 73 only is provided integrally in one piece (see FIG. 1).

The sector gear 71 is a gear configured to be in mesh with a pinion gear 82 provided in the operation unit 8, to allow the four-bar linkage to be actuated by rotation of the pinion gear 82, and is formed at an upper surface of a rear end portion of the rear link 7R which upper surface is a surface facing upward when the rear link 7R is positioned as shown in FIG. 4. Each of gear teeth of the sector gear 71 is provided substantially along a segment of a circle whose center coincides with the side frame 30 side axis of rotation of the rear link 7R (i.e., pin 93).

The first stopper portion 72 and the second stopper portion 73 are portions configured to come in contact with the to-be-contacted surface 52A of the upper rail 52 so as to restrict a range of actuation of the four-bar linkage. To be more specific, the first stopper portion 72 is a portion configured to come in contact with the to-be-contacted surface 52A to restrict actuation of the four-bar linkage when the left and right side frames 30 (seat bottom) are in the highest position (see FIG. 7(*b*)); the second stopper portion 73 is a portion configured to come in contact with the to-be-contacted surface 52A to restrict actuation of the four-bar linkage when the seat bottom is in the lowest position.

The first stopper portion 72 is a portion protruding frontward from a position near a portion of the rear link 7R at which the pin 94 is supported thereby, and is provided on the front end side of the rear link 7R which is disposed opposite (across the pin 94) to the rear end side thereof on which the sector gear 71 is provided. The end face (front end face) of this first stopper portion 72 provides a first contact surface 72A which comes in contact with the to-be-contacted surface 52A when the seat bottom is in the highest position.

As shown in FIG. 7(*b*), the first contact surface 72A of the first stopper portion 72 has a front end and a rear end such that the front end is positioned frontward of the rotary shaft 81A of an operation knob 81 (operation member), which will be described later, of the operation unit 8 when the first contact surface 72A is in contact with the to-be-contacted surface 52A, and the normal L1 of the to-be-contacted surface 52A as produced on the rear end of the first contact surface 72A crosses the operation unit 8 when the first contact surface 74A is in contact with the to-be-contacted surface 52A.

Turning back to FIG. 4, the second stopper portion 73 is a portion protruding downward from a position between the pins 93, 94 of the rear link 7 when the rear link 7 is positioned as shown in FIG. 4, and is provided on the lower surface side of the rear link 7 which is disposed opposite (across the pins 93, 94) to the upper surface side thereof on which the sector gear 71 is provided, with respect to the pins 93, 94 (plane PL3 connecting the center of rotation of the pin 93 and the center of rotation of the pin 94). The end face (lower end face) of this second stopper portion 73 provides a second contact surface 73A which comes in contact with the to-be-contact surface 52A when the seat bottom is in the lowest position.

In the present embodiment, the pin 94 that is a slide rail 5 side rotary shaft (joint shaft) of the rear link 7R is provided between the first stopper portion 72 and the second stopper portion 73 in the front-rear direction.

The second contact surface 73A of the second stopper portion 73 has a rear end and a front end such that the rear end is positioned rearward of the rotary shaft 81A of the operation knob 81 when the second contact surface 73A is in contact with the to-be-contacted surface 52A, and the normal L2 of the to-be-contacted surface 52A as produced on the front end of the second contact surface 73A crosses the operation unit 8 when the second contact surface 73A is in contact with the to-be-contacted surface 52A.

As shown in FIG. 1, the left and right rear links 7 are connected with each other by a generally cylindrical connecting pipe 75. In the present embodiment, the rear links 7 and the connecting pipe 75 are joined, as in a conventional manner, by inserting the end portion of the connecting pipe 75 in a through hole having a substantially circular shape in side view provided in each rear link 7, and welding them together. However, the present invention is not limited to this manner, but the rear links 7 may be provided with the same configuration as that of the front links 6, which may be used to join them together.

The operation unit 8 is a member for adjustment of the height of the seat bottom by allowing the four-bar linkage to be actuated by the occupant's operation, and is fixed to a rear portion of an outer surface that faces outward in the left-right direction of the right side frame 30 that is one of the left and right side frames 30. A specific arrangement of the operation unit 8 will be described later.

This operation unit 8 is, as shown in FIG. 3, configured to mainly include a plate-like base portion 80, an operation knob 81 as an operation member, a pinion gear 82 (see FIG. 4), and a fixing portion 83.

The operation knob 81 is supported rotatably relative to the base portion 80, and disposed to protrude outward from an outer surface of the fixing wall 31 (side frame 30) that faces in one of the left or right directions. Although not illustrated in the drawings, this operation knob 81 is configured according to a known construction, to be rotatable with friction against the base portion 80.

As shown in FIG. 4, the pinion gear 82 is supported on the base portion 80 so as to be rotatable relative to the base portion 80 coaxially with the operation knob 81 together with the operation knob 81 by the operation knob 81 being operated, and disposed at an inner side of the fixing wall 31 which faces inward in the left-right direction. This pinion gear 82 is in mesh with the sector gear 71 of the rear link 7R. With this configuration, by rotating the operation knob 81, the pinion gear 82 is caused to rotate, and the four-bar linkage is actuated, so that the height of the seat bottom (left and right side frames 30) can be adjusted.

Turning back to FIG. 3, the fixing portion 83 is a generally triangular plate-like portion protruding from the base portion 80 radially outward; in this embodiment, two fixing portions are provided. To be more specific, of two fixing portions 83, one protrudes in a direction opposite to that in which the other protrudes, symmetrically with respect to the rotary shaft 81A of the operation knob 81.

Each fixing portion 83 has one positioning hole 83A (through hole) having a generally circular shape in side view provided to locate the fixing portion 83 (operation unit 8) in place relative to the side frame 30. These total two fixing holes 83A are provided near an end portion 83B of each fixing portion 83 so as to be aligned with two positioning holes 35 provided in the side frame 30.

In the present embodiment, the diameter of each positioning hole 83A of the fixing portion 83 is substantially the same as the diameter of a cylindrical portion (portion to be inserted in the positioning hole 83A) of a pin P (see FIG. 6($a$)) for positioning which will be described later. Each positioning hole 35 of the side frame 30 is designed to have a diameter larger than that of the positioning hole 83A of the fixing portion 83. The specific size (indicating how large it is) of the positioning hole 35 will be described later.

The operation unit 8 is attached to a bottom wall of a recessed portion provided in the side frame 30, more specifically, to a fixing wall 31 recessed relative to the flange portion 32, etc. in one of the left and right directions that faces inward. With this configuration, the amount of protrusion of the operation unit 8 in the one of the left and right directions that faces outward can be reduced, and thus the seat bottom can be downsized in the left-right direction, so that the car seat 1 can be made compact.

Since the operation unit 8 is attached to the fixing wall 31 (the bottom wall of the recessed portion), the length of the rotary shaft of the pinion gear 82 can be shortened, for example, in comparison with a configuration in which the operation unit 8 is attached to a surface flush with a surface of the mount portion 30B to which the reclining mechanism 9 is attached. Accordingly, the effect from a load imposed on the rotary shaft (rotary shaft 81A) of the pinion gear 82 can be reduced.

This operation unit 8 is fixed to the fixing wall 31 (side frame 30) by welding. Accordingly, the operation unit 8 can be fixed to the side frame 30 firmly, and thus the resistance to impact, for example, as in a rear-end collision with another car, can be increased.

Furthermore, the operation unit 8 is fixed to the side frame 30 with the fixing portion 83 welded to the side frame 30. Accordingly, the operation unit 8 and the side frame 30 can be welded together in a position remote from the operation knob 81, etc. that is a movable part, and thus the detrimental effects of sputter and heat produced during the welding process can be suppressed.

In the present embodiment, two fixing portions 83 are provided, and the fixing strength for the operation unit 8 fixed to the side frame 30 can be further improved, so that the operation unit 8 can be fixed with increased stability.

Arrangement of the operation unit 8 will now be described in detail.

In the present embodiment, the operation unit 8 is arranged such that the rotary shaft 81A of the operation knob 81 is disposed rearward of the seat spring 4. Accordingly, the pinion gear 82 and other constructions of the operation unit 8 provided to actuate the four-bar linkage can be disposed in a position remote from the portion of the seat bottom on which an occupant is to be seated, so that a feel of seating can be kept comfortable.

Particularly, in the present embodiment, the whole operation unit 8 is disposed rearward of the rear engaging portion 34, and thus the operation unit 8 and the engaging portion 34 fail to overlap each other in the front-rear direction. Therefore, the flexibility in the position of the engaging portion 34 in the upper-lower direction can be improved, and thus the flexibility of arrangement of the seat spring 4 engaged with the engaging portion 34 can be improved, so that a feel of seating can be made more comfortable.

In the present embodiment, the seat springs 4 are adopted as an occupant support member (member configured to support an occupant sitting on the seat bottom) whereby an overlapped region between the operation unit 8 and the seat springs 4 in the front-rear direction is small, and the flexibility of arrangement of the seat springs 4 themselves is also increased. With this as well, the feel of seating can be improved.

Since the rotary shaft 81A of the operation knob 81 is disposed rearward of the seat springs 4, the main body portion 30A can be downsized in the upper-lower direction (made lower in profile) in comparison with a configuration in which the rotary shaft 81A and the seat springs 4 are arranged one above the other so as to overlap each other in the upper-lower direction, so that the side frames 30 can be made more compact in height.

Moreover, the operation unit 8 is fixed in such a position that one fixing portion 83 faces to the engaging portion 34, that is, two fixing portions 83 face substantially in the front-rear direction. With this configuration, the side frames 30 can be made more compact in height in comparison with a configuration in which operation unit 8 is fixed with the fixing portions 83 facing in the upper-lower direction.

Moreover, the operation unit 8 is disposed in an upwardly shifted position relative to the main body portion 30A so that its upper portion overlaps a lower portion of the mount portion 30B. With this configuration, the main body portion 30A can be made lower in profile, and thus the side frames 30 can be made more compact in height.

Moreover, the operation unit 8 is disposed on a line L3 connecting a center of rotation of the reclining mechanism 9 and a rear end of the rear engaging portion 34 as viewed in the left-right direction. With this configuration, the reclining mechanism 9, the operation unit 8 and the rear engaging portion 34 (seat spring 4) can be arranged in a straight line, and thus the side frames 30 can be made more compact in height.

As shown in FIG. 2, the operation unit 8 is provided such that the rotary shaft 81A of the operation knob 81 is disposed above a plane PL1 connecting the pin 91 that is a side frame 30 side center of rotation of the front link 6 and the pin 93 that is a side frame 30 side center of rotation of the rear link 7. Accordingly, the operation unit 8 is disposed above a region of actuation of the four-bar linkage, and thus the side frames 30 can be made compact in height without obstructing the motions of the front link 6 and the rear link 7.

As shown in FIG. 3, the operation unit 8 is arranged such that its upper front portion lies over the upper gap portion 32A. With this configuration, the side frames 30 can be made more compact in height, for example, in comparison with a configuration in which the operation unit 8 is attached between the upper and lower flange portions 32 in which no upper gap portion 32A is provided.

In the present embodiment, the operation unit 8 is fixed in such a position that the front fixing portion 83 extends over the upper gap portion 32A, and thus the operation unit 8 can be disposed in a higher/upper position in comparison with a configuration in which the front fixing portion 83 is fixed in such a position as not to lie over the upper gap portion 32A. Accordingly, the side frames 30 can be made more compact.

Moreover, the operation unit 8 is configured such that, when the operation unit 8 is seen from the left or right direction, the end portion 83B as the farthest protruding portion of the rear fixing portion 83 is disposed to avoid a line L4 connecting a center of rotation of the reclining mechanism 9 and a center of rotation of the operation knob 81 (below that line L4), and the end portion 83B of the front fixing portion 83 is disposed to avoid a line L5 connecting a rear end of the rear engaging portion 34 and a center of rotation of the operation knob 81 (above that line L5). Accordingly, the reclining mechanism 9, the operation unit 8 and the rear engaging portion 34 can be arranged in positions closer to one another in the upper-lower direction, so that the side frames 30 can be made more compact in the upper-lower direction.

Moreover, the operation unit 8 is arranged such that the rotary shaft 81A of the operation knob 81 is disposed above the seat springs 4. With this configuration, the operation unit 8 can be arranged in a position closer to the front in comparison with a configuration in which the operation unit 8 is disposed directly rearwardly of the seat springs 4, and thus the side frames 30 can be made more compact in the front-rear direction.

Moreover, the operation unit 8 is configured such that the front fixing portion 83 is fixed to the rear engaging portion 34, more specifically, to a position adjacent to the through hole 34A provided in the engaging portion 34 (side frame 30). Although the portion of the side frame 30 around the through hole 34 has a low rigidity, the fixing portion 83 fixed to the portion near the through hole 34A provides a double-wall structure of the fixing wall 31 and the plate-like fixing portion 83 near the through hole 34A, and thus enhances the rigidity of the seat bottom frame 3 as a whole.

Moreover, the operation unit 8 is attached to such a position, at an obliquely front and lower side of the reclining mechanism 9, as to be disposed adjacent to the reclining mechanism 9 and to lie over a portion rearward of the front end of the mount portion 30B to which the reclining mechanism 9 is attached. Since both of the operation unit 8 and the reclining mechanism 9 are high-rigidity members, the side frame 30 as a whole can be enhanced in rigidity by arranging these members in positions closer to each other. Furthermore, with this configuration, the height adjustment operation for the seat bottom activated by operating the operation unit 8 and the angle adjustment operation for the seat back frame 2 activated by operating the reclining mechanism 9 can be made with increased stability.

In the present embodiment, the weld W1 for the front fixing portion 83 is disposed near the engaging portion 34, and the weld W2 for the rear fixing portion 83 is disposed near the reclining mechanism 9, and thus the rigidity of the side frames 30 can be increased further.

As indicated by a chain line in FIG. 2, the right side frame 30 to which the operation unit 8 is attached is provided with an operation lever 9L for operating the reclining mechanism 9. This operation lever 9L is provided to extend from the front portion of the reclining mechanism 9 substantially in an obliquely frontward and downward direction as viewed from one of the left and right direction which faces outward, and part of the operation lever 9L is disposed outside the operation knob 81 in the left-right direction so as to lie over the rotary shaft 81A of the operation knob 81. With this configuration, the space on the inner side of the operation lever 9L which faces inward in the left-right direction can be utilized effectively, and thus the car seat 1 can be made more compact.

Although not illustrated, in the present embodiment, the operation knob 81 is provided with a height mechanism operation lever for rotating the operation knob 81. This height mechanism operation lever is provided to extend from the front portion of the operation knob 81 through a gap between the side frame 30 and the operation lever 9L substantially frontward.

In the present embodiment, the operation unit 8 is disposed at the rear portion of the side frame 30, and thus the flexibility of arrangement of the portion of the height mechanism operation lever to be manipulated by an occupant can be increased. Accordingly, the height mechanism operation lever can be arranged in such a position as to be easy for an occupant to manipulate, so that the operational ease of the operation knob 81 can be improved.

Next, a description will be given of a method for manufacturing the car seat 1 described above, to be more specific, of fixing of the operation unit 8 to the side frame 30 in the manufacturing process for the car seat 1.

To fix the operation unit 8 to the side frame 30, first, as shown in FIG. 6(*a*), a pin P for tentative retention is inserted in the positioning hole 83A of the fixing portion 83 and the positioning hole 35 of the side frame 30 to which the rear link 7R is joined, so that the operation unit 8 is tentatively retained at the side frame 30 (tentative retention step). Accordingly, as shown in FIG. 6(*b*), the pinion gear 82 of the operation unit 8 and the sector gear 71 of the rear link 7R come in mesh with each other.

In the present embodiment, as described above, the diameter of the positioning hole 83A is substantially the same as the diameter of the cylindrical portion of the pin P, and the diameter of the positioning hole 35 is larger than the diameter of the positioning hole 83A. With this configuration, the operation unit 8 is tentatively retained with a small amount of play left along the surface of the fixing wall 31. As a result, the pinion gear 82 can be pressed against the sector gear 71 by pressing the operation unit 8 in the direction indicated by an arrow.

In the manufacturing method of the present embodiment, then, the fixing portion 83 of the operation unit 8 and the fixing wall 31 of the side frame 30 are welded together by a welding torch T while the pinion gear 82 is pressed against the sector gear 71, and the operation unit 8 is thereby fixed to the side frame 30 (fixing step).

With this fixing process for the operation unit 8, the gap between the teeth of the pinion gear 82 and the teeth of the sector gear 71 can be narrowed, so that a rattle of the pinion gear 82 and the sector gear 71 can be suppressed. Since even when an impact is imposed on the car seat 1, for example, in a rear-end collision of the car or the like, the rotation of the rear link 7 can be suppressed, sinking of the seat bottom as a result of the actuation of the four-bar linkage can be suppressed.

In view of the aspects described above, in the present invention, it is preferable that the size of the positioning hole 35 be large enough to make an adjustment to the gap between the teeth of the pinion gear 82 and the teeth of the sector gear 71 possible, and small enough to make the tentative retention of the operation unit 8 to the side frame 30 using the pin P possible. This is, in other words, because if the size of the positioning hole 35 is substantially the same as that of the positioning hole 83A, the adjustment to the gap between the teeth of the pinion gear 82 and the teeth of the sector gear 71 becomes difficult, while if the size of the positioning hole 35 is too large, the operation unit 8 could fall off the side frame 30 during the tentative retention.

Lastly, a description will be given of an operation of height adjustment for the car seat 1.

When the side frames 30 are in the lowest position as shown in FIG. 7(*a*), a rotational motion of the pinion gear 82 in the clockwise direction of the drawing caused by an occupant operating the operation knob 81 causes the sector gear 71 of the rear link 7R in mesh with the pinion gear 82 to rotate on the pin 93 in the counterclockwise direction of the drawing. This causes the left and right rear links 7 connected by the connecting pipe 75 to rise frontward.

Simultaneously with this motion, the front links 6 (which constitute the four-bar linkage in conjunction with the rear links 7, the slide rails 5 and the side frames 30) as well are caused to rise frontward; therefore, as shown in FIG. 7(*b*), the side frames 30 move upward. In this way, the positions of the side frames 30 can be lifted to a higher level. Thereafter, the first contact surface 72A of the first stopper portion 72 provided at the outer periphery of the rear link 7R is brought into contact with the to-be-contacted surface 52A of the slide rail 5, and the actuation of the four-bar linkage is thereby restricted, and the side frames 30 reach the highest position.

When the side frames 30 are in the highest position as shown in FIG. 7(*b*), a rotational motion of the pinion gear 82 in the counterclockwise direction of the drawing caused by an occupant operating the operation knob 81 causes the sector gear 71 of the rear link 7R in mesh with the pinion gear 82 to rotate on the pin 93 in the clockwise direction of the drawing. This causes the left and right rear links 7 to fall rearward.

Simultaneously with this motion, the front links 6 as well are caused to fall rearward; therefore, as shown in FIG. 7(*a*), the side frames 30 move downward. In this way, the positions of the side frames 30 can be lowered to a lower level. Thereafter, the stopper portion 62 provided at the outer periphery of the front link 6 and the second contact surface 73A of the second stopper portion 73 provided at the outer periphery of the rear link 7 are brought into contact with the to-be-contacted surface 52A, and the actuation of the four-bar linkage is thereby restricted, and the side frames 30 reach the lowest position.

In the present embodiment, the sector gear 71 and the stopper portions 72, 73 are provided integrally in the rear link 7R for lifting and lowering the side frame 30, and the stopper portions 62, 73 are provided integrally in the front link 6 and the rear link 7L; therefore, provision of a stopper as a separate part is not required. Accordingly, the number of parts can be reduced, and the operational ease of the assembly process for the car seat 1 can be improved. Moreover, since the stopper portions 62, 72, 73 are provided integrally at the peripheries of the links 6, 7, the stopper structures can be simplified and downsized, and thus the car seat 1 can be downsized.

In particular, the rear link 7R includes the first stopper portion 72 and the second stopper portion 73, and the actuation of the four-bar linkage can thus be restricted without fail in both of the highest and lowest positions, and the seat bottom can be stably supported in the both positions.

In the present embodiment, the portions with which the stopper portions 62, 72, 73 are to be contacted are provided on the slide rail 5 which constitutes the four-bar linkage; therefore, provision of other parts with which the stopper portions 62, 72, 73 are to be contacted is not required, and thus the number of parts can be reduced. Moreover, with this configuration, the operational ease of the assembly of the car seat 1 can be improved.

In the present embodiment, the pin 94 is provided between the first stopper portion 72 and the second stopper portion 73, and thus the range of motion of the four-bar linkage, that is, the range of adjustable heights of the seat bottom can be maximized while the seat bottom can be stably supported when the stopper portions are in contact with the to-be-contacted surface 52A.

Since the front end of the first contact surface 72A is disposed frontward of the rotary shaft 81A of the operation knob 81 as shown in FIG. 7(b), and the rear end of the second contact surface 73A is disposed rearward of the rotary shaft 81A as shown in FIG. 7(a), the rotary shaft 81A is disposed between the front end of the first contact surface 72A and the rear end of the second contact surface 73A in the front-rear direction. With this configuration, the difference between the lengths of the paths of force transmitted from the rotary shaft 81A, through the pinion gear 82, the sector gear 71 and the rear link 7R, to the to-be-contacted surface 52A can be shortened, and thus the seat bottom can be supported more stably.

Furthermore, both of the normal L1 of the to-be-contacted surface 52A as produced on the rear end of the first contact surface 72A as shown in FIG. 7(b) and the normal L2 of the to-be-contacted surface 52A as produced on the front end of the second contact surface 73A as shown in FIG. 7(a) cross the operation unit 8; in other words, the operation unit 8 is disposed above the both contact surfaces 72A, 73A. With this configuration, the path of the force transmitted from the rotary shaft 81A through the rear link 7R to the to-be-contacted surface 52A can be shortened, and thus the seat bottom can be supported more stably.

In the present embodiment, the first stopper portion 72 is provided on the front end side opposite to the rear end side on which the sector gear 71 is provided, with respect to the pin 94, and the second stopper portion 73 is provided on the lower surface side opposite to the upper surface side on which the sector gear 71 is provided, with respect to the pins 93, 94 (plane PL3): therefore, each stopper portion 72, 73 is provided in a position remote from the sector gear 71. Accordingly, the risk of the effects of the load imposed when each stopper portion 72, 73 is brought into contact with the to-be-contacted surface 52A which would be exerted on the sector gear 71 can be reduced, and thus the four-bar linkage can be actuated as desired.

As described above, according to the present embodiment, the following operations and advantageous effects can be achieved.

Since the upper portion of the operation unit 8 is so disposed as to lie over the mount portion 30B, the main body portion 30A can be made lower in profile accordingly, and the side frame 30 can be made lower in profile (made more compact in height). Furthermore, the operation unit 8 is disposed at the rear portion of the side frame 30, and thus the flexibility of arrangement of a portion of the height mechanism operation lever to be manipulated by an occupant can be increased, and the operational ease of the operation knob 81 can be improved.

Since the rotary shaft 81A of the operation knob 81 of the operation unit 8 is disposed above the plane PL1 connecting the center of the pin 91 and the center of the pin 93, the side frame 30 can be made more compact in height without the risk of obstructing the motions of the front link 6 and the rear link 7.

Since the operation unit 8 is so disposed that an upper portion thereof lies over the upper gap portion 32A, the side frame 30 can be made more compact in height. Moreover, since the side frame 30 includes a flange portion 32, the side frame 30 has irregular surfaces as a whole, and thus the rigidity thereof can be enhanced.

Since the link mount recess portion 33 for connecting the front link 6 is so disposed as to lie over the lower gap portion 32B, the side frame 30 can be made more compact in height. Moreover, provision of the link mount recess portion 33 serves to increase the rigidity of the side frame 30, so that the motion of the front link 6 can be stabilized.

Since the operation unit 8 is attached to the bottom wall (fixing wall 31) of the recessed portion of the side wall 30, the amount of protrusion of the operation unit 8 to the outside in the left-right direction can be made smaller, and thus the seat bottom can be downsized in the left-right direction. Accordingly, the car seat 1 can be made more compact in size. Furthermore, since the side frame 30 has a recessed portion, that is, has irregular surfaces as a whole, the rigidity of the side frame 30 can be increased.

Since the side frame 30 comprises an integrally formed protective wall 36 which covers a region in which the pinion gear 82 and the sector gear 71 are in mesh, entry of an extraneous matter in between the pinion gear 82 and the sector gear 71 can be suppressed. Moreover, since the protective wall 36 is formed integrally in the side frame 30, the number of parts can be reduced and the operational ease can be improved.

Since the protective wall 36 is so formed as to cover, from above, the region in which the pinion gear 82 and the sector gear 71 are in mesh, the entry of an extraneous matter in between the pinion gear 82 and the sector gear 71 can be suppressed more effectively.

Since the operation lever 9L of the reclining mechanism 9 is disposed at an outer side of the operation knob 81 which outer side faces in one of the left and right directions, so as to lie over the rotary shaft 81A of the operation knob 81, space left at an inner side of the operation lever 9L which inner side faces in the other of the left and right directions can be utilized effectively, and thus the car seat 1 can be made more compact.

Since the operation unit 8 and the reclining mechanism 9 which are high-rigidity members are attached to positions adjacent to each other, the side frame 30 as a whole can be enhanced in rigidity. With this configuration, the stability in the height adjustment operation for the seat bottom and the angle adjustment operation for the seat back frame 2 can be improved.

Since the side frame 30 comprises a flange portion 32 having a U-shaped cross section, the rigidity of the side frame 30 can be improved. With this configuration, the stability in the height adjustment operation for the seat bottom and the angle adjustment operation for the seat back frame 2 can be improved.

Since the rotary shaft 81A of the operation knob 81 of the operation unit 8 is disposed rearward of the seat springs 4, the pinion gear 82 and other parts of the operation unit 8 can be located remote from a portion of the seat bottom on which an occupant is seated, so that a feel of seating can be kept comfortable. Moreover, since the main body portion 30A can be made lower in profile in comparison with a configuration in which the rotary shaft 81A and the seat springs 4 are located one over the other, the side frame 30 can be made compact in height.

Since the occupant support member is configured as seat springs 4, a region in which the operation unit 8 and the seat springs 4 overlap each other can be reduced, so that the flexibility of arrangement of the seat springs 4 can be improved. Accordingly, a feel of seating can be improved.

Since the operation unit 8 as a whole is disposed rearward of the engaging portion 34, the operation unit 8 and the engaging unit 34 do not overlap each other in the front-rear direction, and thus the flexibility of arrangement of the engaging portion 34 can be improved. Accordingly the flexibility of arrangement of the seat springs 4 can be improved, and a feel of seating can be improved.

Since the operation unit 8 oriented with its fixing portion 83 positioned closer to the engaging portion 34 is fixed to the side frame 30, the side frame 30 can be made more compact in height.

Since the plate-like fixing portion 83 of the operation unit 8 is fixed at a position adjacent to the engaging portion 34 having through holes 34A, a portion around the through holes 34A can be configured as a double-wall structure, so that the rigidity of the seat bottom frame 3 can be improved.

Since the rotary shaft 81A of the operation knob 81 of the operation unit 8 is disposed in a position higher than that of the seat springs 4 and the operation unit 8 can thus be arranged shifted frontward, the side frame 30 can be made compact in the front-rear direction.

Since the operation unit is disposed on the line L3 connecting the center of rotation of the reclining mechanism 9 and the rear end of the engaging portion 34, the reclining mechanism 9, the operation unit 8 and the seat spring 4 are arranged on a straight line, so that the side frame 30 can be made compact in height.

Since the operation unit 8 is fixed to the side frame 30 by welding, the operation unit 8 can be fixed firmly to the side frame 30, so that the impact resistance of the operation unit 8 can be increased.

Since the operation unit 8 has the fixing portion 83 welded to the side frame 30, the operation unit 8 and the side frame 30 can be welded in a position remote from the operation knob 81 that is a movable portion; therefore, the detrimental effects of sputter and the like produced during the welding process can be suppressed.

Since two fixing portions 83 are provided, the fixing strength for the operation unit 8 to the side frame 30 can be improved, so that the operation unit 8 can be fixed more stably.

Since the fixing portion 83 of the operation unit 8 is fixed at a position adjacent to the through hole 34k a portion around the through holes 34A can be configured as a double-wall structure, so that the rigidity of the seat bottom frame 3 can be improved.

Since the positioning hole 35 of the side frame 30 is larger than the positioning hole 83A of the fixing portion 83, the fixing of the operation unit 8 to the side frame 30 can be realized by inserting a pin P through the positioning holes 35, 83A to tentatively retain the operation unit 8 at the side frame 30, and welding the fixing portion 83 to the side frame 30 while pressing the pinion gear 82 against the sector gear 71. By such fixing, a gap between teeth of the pinion gear 82 and teeth of the sector gear 71 can be narrowed, and thus a rattle of the pinion gear 82 and the sector gear 71 can be suppressed; in particular, sinking of the seat bottom which would occur when an impact is imparted can be suppressed.

Since the end portion 83B of the rear fixing portion 83 is disposed below the line L4 connecting the center of rotation of the reclining mechanism 9 and the center of rotation of the operation knob 81, the reclining mechanism 9 and the operation unit 8 can be arranged in positions closer to each other, so that the side frame 30 can be made compact in size.

Since the end portion 83B of the front fixing portion 83 is disposed above the line L5 connecting the rear end of the engaging portion 34 and the center of rotation of the operation knob 81, the engaging portion 34 and the operation unit 8 can be arranged in positions closer to each other, so that the side frame 30 can be made compact in size.

Since the end portion 83B of the rear fixing portion 83 is disposed below the line LA and the end portion 83B of the front fixing portion 83 is disposed above the line L5, the reclining mechanism 9, the operation unit 8 and the engaging portion 34 can be arranged in positions closer to one another in the upper-lower direction, so that the side frames 30 can be made more compact in the upper-lower direction.

According to the above-described method for manufacturing a car seat 1, the operation unit 8 is fixed to the side frame 30 by welding, and thus the operation unit 8 can be fixed to the side frame 30 firmly. Moreover, as a gap between the teeth of the pinion gear 82 and the teeth of the sector gear 71 can be narrowed, a rattle of the pinion gear 82 and the sector gear 71 can be suppressed, and in particular, sinking of the seat bottom which would occur when an impact is imparted can be suppressed.

Second Embodiment

Next, referring mainly to FIGS. 9-12, a second embodiment of the present invention will be described. In the following description, the same elements as those mentioned in the above-described embodiment will be designated by the same reference characters, and its description will be omitted.

In the above-described first embodiment, an exemplary configuration has been explained in which pins 92, 94 are adopted as joint shafts by which the front and rear links 6, 7 are supported rotatably relative to the slide rails 5 (link support member). In the present embodiment, as shown in FIGS. 9-11, load detection sensors 10 are provided in the form of such joint shafts.

Figure 9:
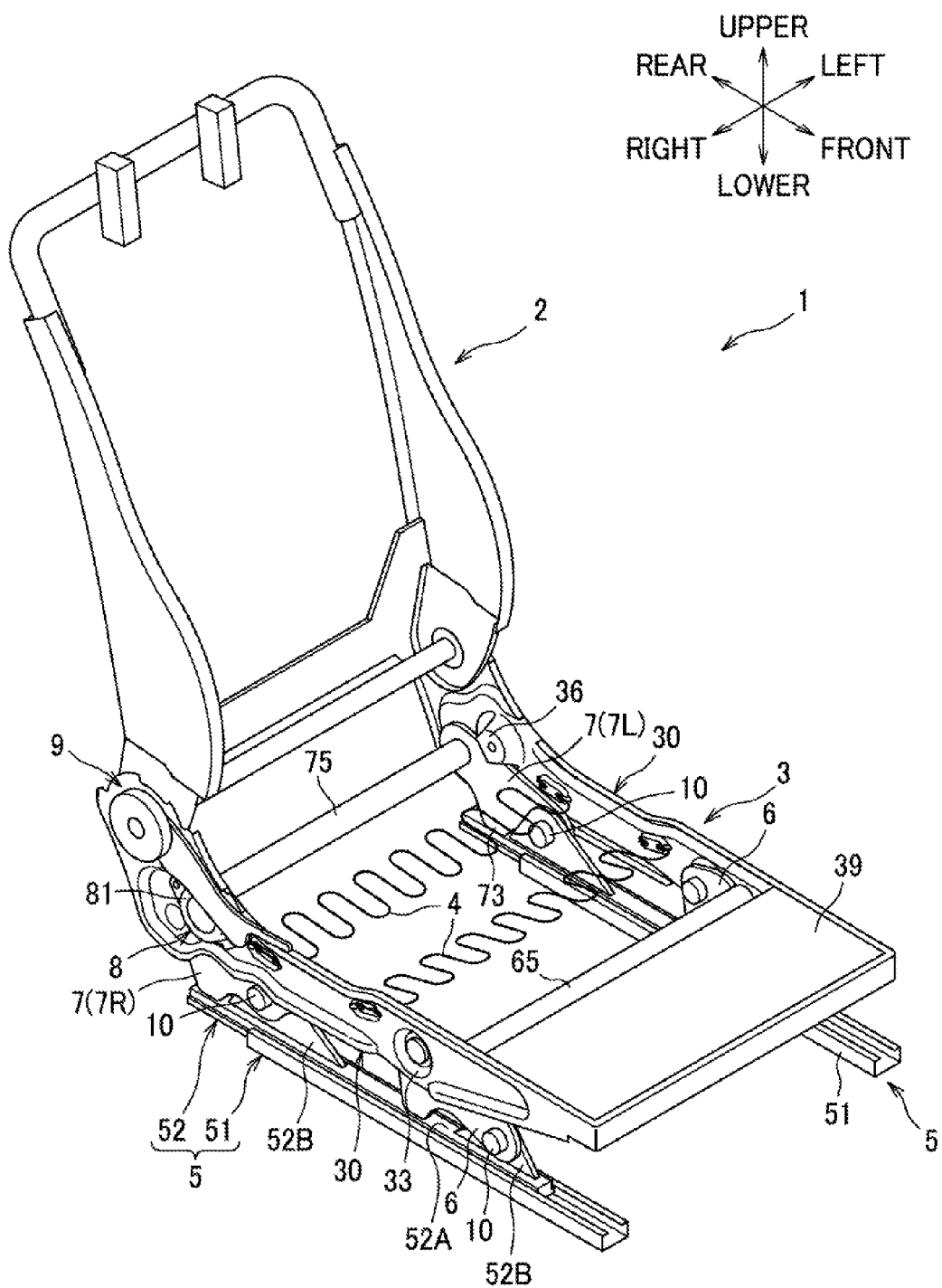
FIG. 9 is a perspective view of a car seat according to a second embodiment of the present invention.
Figure 10:
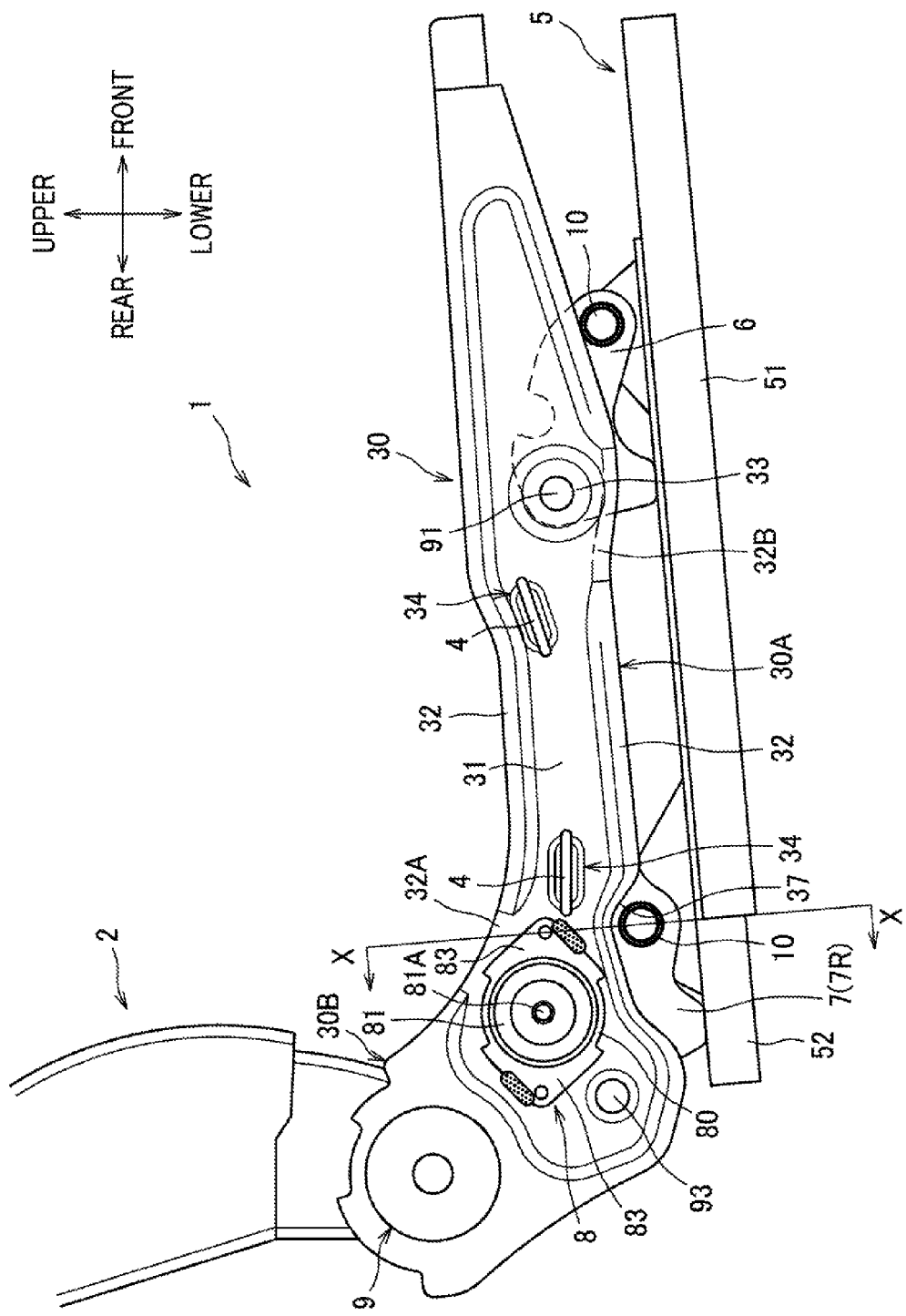
FIG. 10 is a side elevation of the car seat according to the second embodiment as viewed from an outer side.
Figure 11:
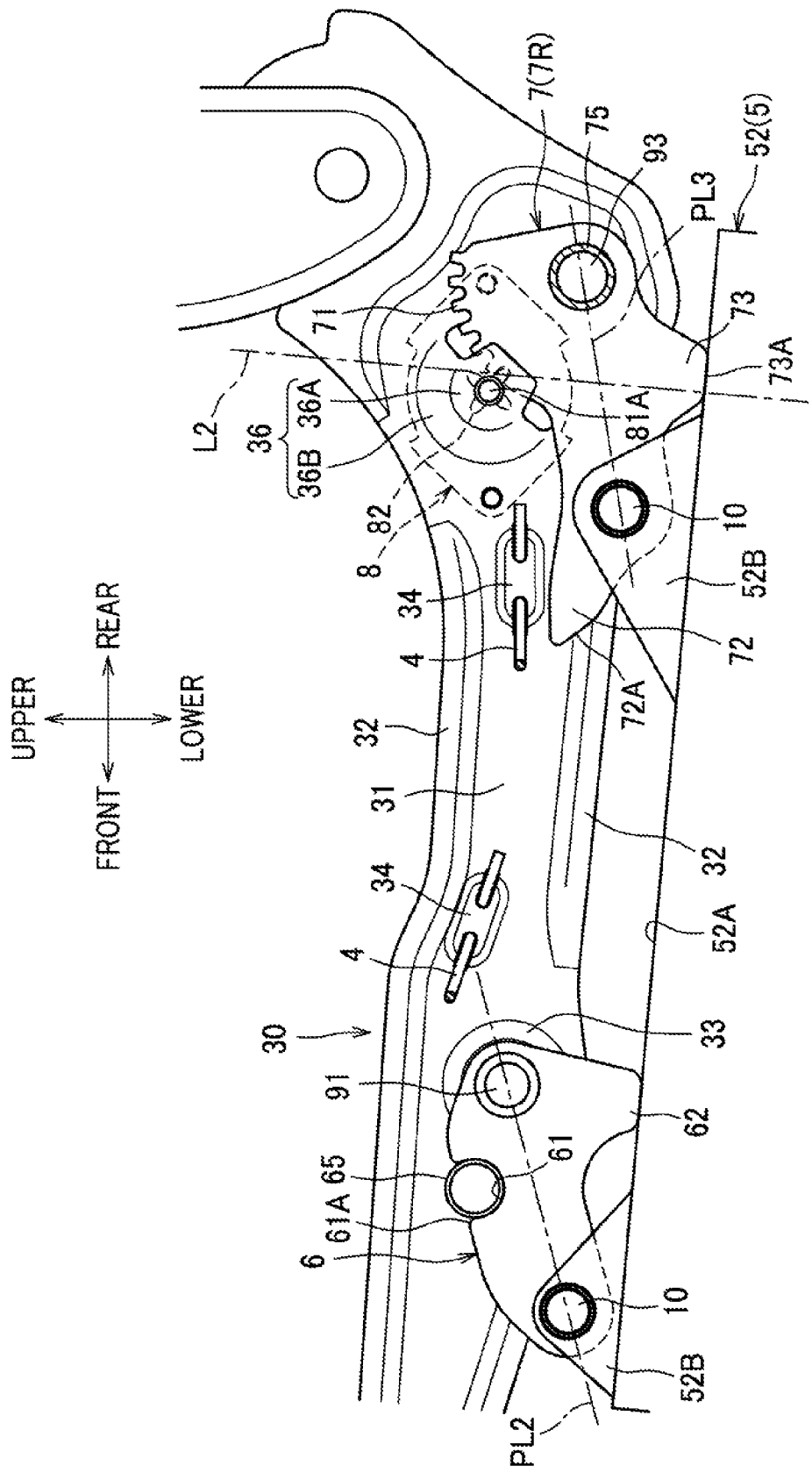
FIG. 11 is a side elevation of the car seat according to the second embodiment as viewed from an inner side.

As shown in FIGS. 9-11, a car seat 1 as one example of a vehicle seat is configured such that a height of a seat bottom for an occupant to be seated thereon is adjustable, and mainly includes a seat back frame 2 constituting a frame of a seat back, a seat bottom frame 3 constituting a frame of a seat bottom, seat springs 4, slide rails 5 as a link support member, front links 6 and rear links 7 provided as a pair of front and rear links, an operation unit 8, and load detection sensors 10 as an example of a detection sensor.

As shown in FIG. 11, the front link 6 and the rear link 7 are rotatably joined to the side frame 30 and the upper rail 52 (slide rail 5) respectively, so as to constitute a linkage in which the links 6, 7 function, in combination with the side frame 30 and the slide rail 5, as a height adjustment mechanism. With this linkage, the left and right side frames 30 (seat bottom) can be lifted or lowered relative to the slide rails 5 (relative to the floor of the car).

To be more specific, the front links 6 are provided one at the left and one at the right (only one of them is illustrated), and a rear end portion (at the rear in the drawing) of each front link 6 is joined by a pin 91 to the bottom wall of a link mount recess portion 33 so as to form a nodal point at a front portion of the side frame 30 (main body portion 30A). The pin 91 supports the front link 6 in a manner that permits the front link 6 to rotate, so that the front link 6 is rotatable relative to the side frame 30.

A front end portion (at the front in the drawing) of each front link 6, which is joined by a pin 92 in the first embodiment, is joined by a load detection sensor 10 so as to form a nodal point at a front link support portion 52B of the upper rail 52. The load detection sensor 10 supports the front link 6 in a manner that permits the front link 6 to rotate, so that the front link 6 is rotatable relative to the slider rail 5. A detailed description of the load detection sensor 10 will be given later.

The rear links 7 are provided one at the left and one at the right (only one of them is illustrated), and a rear end portion (at the rear in the drawing) of each rear link 7 is joined by a pin 93 to an inner side of a fixing wall 31 which inner side faces in one of the left and right directions, so as to form a nodal point at a rear portion of the side frame 30 (main body portion 30A). The pin 93 supports the rear link 7 in a manner that permits the rear link 7 to rotate, so that the rear link 7 is rotatable relative to the side frame 30.

A front end portion (at the front in the drawing) of each rear link 7, which is joined by a pin 94 in the first embodiment, is joined by a load detection sensor 10 so as to form a nodal point at a rear link support portion 52B of the upper rail 52. The load detection sensor 10 supports the rear link 7 in a manner that permits the rear link 7 to rotate, so that the rear link 7 is rotatable relative to the slider rail 5.

The functions of joint shafts by which the front link 6 and the rear link 7 are supported rotatably relative to the link support portion 52B, as embodied in the first embodiment by the pin 92 and the pin 94, are implemented in the present embodiment by the load detection sensors 10, respectively.

The left and right front links 6 are connected by a connecting pipe 65 which extends from one side frame 30 to the other side frame 30 by welding such that the front links 6 are welded to the connecting pipe 65 while keeping substantially cylindrical end portions of the connecting pipe 65 engaged in their recessed portions 61. The left and right rear links 7 are connected by a connecting pipe 75 as a connecting member which extends from one side frame 30 to the other side frame 30.

The connecting pipes 65, 75 are both attached to the front links 6 or the rear links 7 in such positions as to avoid the load detection sensors 10. To be more specific, the connecting pipe 65 is attached in a position shifted from the load detection sensor 10 in an obliquely rearward and upward direction when the front link 6 is positioned as shown in FIG. 11, while the connecting pipe 75 is attached in a position rearward and upward of the load detection sensor 10 (i.e., the position coincide with the pin 93) when the rear link 7 is positioned as shown in FIG. 11.

In this way, the connecting pipes 65, 75 are attached in such positions as to avoid the to load detection sensor 10, and thus interference between the load detection sensors 10 and the connecting pipes 65, 75 can be suppressed. Also, as the connecting pipes 65, 75 are welded to the links 6, 7 in such positions as to avoid the load detection sensors 10, the influence of welding sputter and heat on the load detection sensors 10 can be reduced.

The load detection sensor 10 is a sensor for determining a state of the seat bottom, to be more specific, for determining how much load is imposed on the seat bottom. Furthermore, the load detection sensor 10 is a sensor configured to detect a load measured when an occupant sits on the seat bottom (car seat 1); in the present embodiment, the total four load detection sensors 10 are provided in the car seat 1 (only two sensors are shown in FIG. 11).

Figure 12:
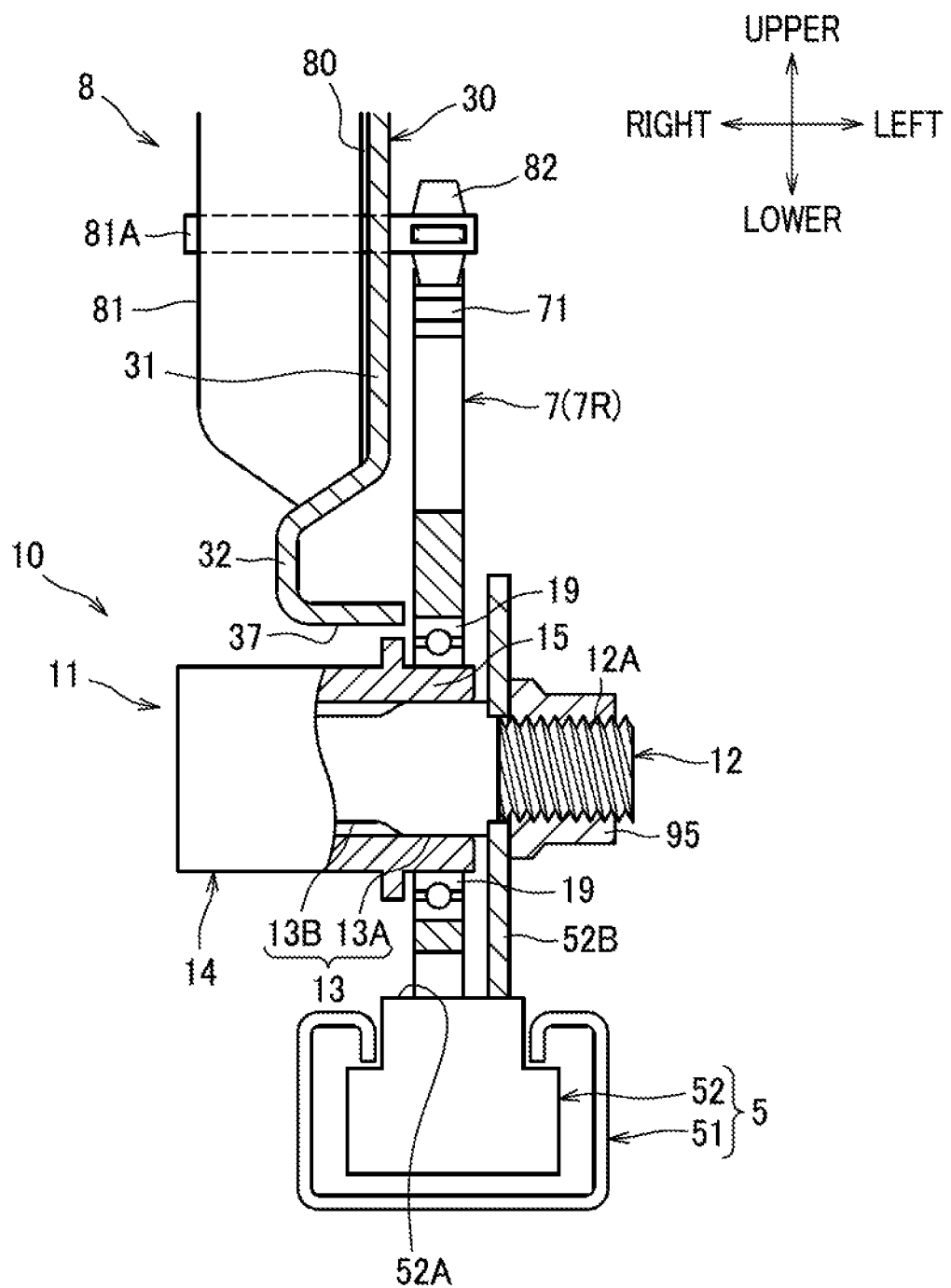
FIG. 12 is a sectional view taken along line X-X of FIG. 10.

As shown in FIG. 12, the load detection sensor 10 mainly includes a sensor body 11 for sensing a load, and an extended shaft portion 12 for use in attaching the load detection sensor 10 to the link support portion 52B.

The sensor body 11 is configured to mainly include a stowed shaft portion 13, a tubular sheath 14 having a cylindrical shape with a bottom, a strain gage (not shown), and a substrate unit (not shown) attached to the tubular sheath 14.

The stowed shaft portion 13 is provided inside the tubular sheath 14, and includes a large-diameter portion 13A and a small-diameter portion 13B having a reduced diameter and extending from the large-diameter portion 13A in one of the left and right directions that faces outward. Although not illustrated, the small-diameter portion 13B is connected with the tubular sheath 14 at the bottom of the tubular sheath 14. In other words, the stowed shaft portion 13 and the tubular sheath 14 are integrally formed (as a single part).

The large-diameter portion 13A is in a position near an open end of the tubular sheath 14, and its outside diameter is slightly smaller than the inside diameter of the tubular sheath 14 (load detection portion 15). Therefore, when no occupant is seated on the car seat 1, a small gap is formed between the outer peripheral surface of the large-diameter portion 13A and the inner peripheral surface of the tubular sheath 14 (load detection portion 15).

The open end portion of the tubular sheath 14 (at an end facing outward in the left-right direction) forms a load detection portion 15 as a detection part in which a load is detectable. When an occupant sits on the car seat 1, a load is imposed on the load detection portion 15 through the rear link 7 (or the front link 6) along a radial direction of the tubular sheath 14. At this time, the load detection portion 15 deforms along the load imposing direction so as to come near the large-diameter portion 13A. The amount of deformation of the load detection portion 15 is detected by the strain gage (not shown), and outputted to an external control unit or the like through the substrate unit.

The detection results of the load detection sensor 10 are utilized in the control exercised over the operations of facilities equipped in the car, such as control over the development of an airbag device. For this control and structure related to this control, any prevailing methods and structures may be adopted, and thus a detailed description thereof will be omitted in this description.

The extended shaft portion 12 has an outside diameter smaller than that of the large-diameter portion 13A of the stowed shaft portion 13 (i.e., the substantially the same outside diameter as that of the small-diameter portion 13B), and is provided, integrally with the stowed shaft portion 13, so as to extend from a left or right outer end of the stowed shaft portion 13 (large-diameter portion 13A) toward outside. This extended shaft portion 12 protrudes from the tubular sheath 14 to the outside, and has an external thread 12A formed on an outer cylindrical surface of its protruded portion.

The load detection sensor 10 as described above is attached to the car seat 1 with the axis of the sensor body 11 and the extended shaft portion 12 extending substantially along the left-right direction (horizontal direction). Moreover, the load detection sensor 10 is disposed on an axis of rotation of the rear link 7 (or the front link 6) rotatable relative to the link support portion 52B of the slide rail 5. To be more specific, the load detection sensor 10 is configured as a joint shaft by which the rear link 7 (or the front link 6) and the link support portion 52B are supported rotatably relative to each other.

To be more specific, the load detection sensor 10 is attached to the rear link 7 (or the front link 6) by inserting the tubular sheath 14 (load detection portion 15) through the through hole provided in the rear link 7 (or the front link 6). Moreover, the load detection sensor 10 is fixed to the link support portion 52B (slide rail 5) by inserting the extended shaft portion 12 through the through hole provided in the link support portion 52B and screwing a nut 95 on the external thread 12A.

Furthermore, the through holes provided in the rear link 7 and the front link 6 are provided with ball bearings 19, and the load detection portion 15 is inserted in the through hole via the ball bearings 19. In this way, the rear link 7 and the front link 6 are provided rotatably on the load detection portion 15 (load detection sensor 10).

As described above, the front and rear links 6, 7 are provided rotatably on the load detection portion 15, and thus the posture of the load detection portion 15 will not change even when the linkage is actuated; therefore, the load can be detected under the same conditions independent from the height position of the seat bottom. In this way, the accuracy of the control exercised based on the detection results of the load detection sensor 10 can be improved.

In the present embodiment, the load detection sensor 10 is provided in the joint shaft by which the rear link 7 (or the front link 6) is joined to the link support portion 52B, and thus the height position of the load detection portion 15 (load detection sensor 10) will not change even when the linkage is actuated.

The load detection sensor 10 attached to the car seat 1 has its sensor body 11 positioned such that its major portion protrudes from the load detection sensor 15 (rear link 7) to the outside in the left or right direction (to the side frame 30 side). With this in view, in the present embodiment, as shown in FIG. 10, a recess 37 configured to receive the sensor body 11 (protruding portion) when the seat bottom is in the lowest position is provided at the lower portion of the side frame 30.

To be more specific, the recess 37 is provided on the lower edge of the rear portion of the main body portion 30A and, specifically, in a position shifted from that of the rear engaging portion 34 in an obliquely rearward and downward direction, so that the sensor body 11 of the load detection sensor 10 can be received therein when the seat bottom is in the lowest position. It is to be understood that the recess 37 may be provided to have a depth such that the entire sensor body 11 is received therein, or also may be provided to have a depth such that only a part of the sensor body 11 can be received therein.

By providing such a recess 37, interference between the side frame 30 and the load detection sensor 10 can be suppressed, and thus the height of the car seat 1 with its seat bottom adjusted in the lowest position can be made lower. Accordingly, the car seat 1 can be made compact, in particular when it is in the lowest position.

Since the sensor body 11 (tubular sheath 14) is configured to protrude outward in the left or right direction, in other words, so arranged as to be visible from outside of the car seat 1, the ease of maintenance of the load detection sensor 10 is improved in comparison with a configuration in which the tubular sheath 14 protrudes inward of the rear link 7 in the left or right direction.

As shown in FIG. 11, in the present embodiment, the rear load detection sensor 10 is disposed frontward of the connecting pipe 75. Accordingly, no additional structure is required in the rear link 7 for arrangement of the load detection sensor 10 such as a portion extending toward a position rearward of the connecting pipe 75, so that upsizing of the rear link 7 in the front-rear direction can be suppressed. As a result, upsizing of the car seat 1 in the front-rear direction can be suppressed.

Moreover, in the present embodiment, the front and rear load detection sensors 10 are disposed in positions lower than the connecting pipes 65, 75. With this configuration, interference between the load detection sensors 10 and the side frame 30 can be suppressed.

Furthermore, the rear load detection sensor 10 is disposed in a position frontward and downward of the connecting pipe 75, and thus interference thereof with the side frame 30 can be suppressed and upsizing of the car seat 1 in the front-rear direction can be suppressed.

The load detection sensor 10 is attached so as to have the axis of the sensor body 11 or the like oriented along the left-right direction, and thus disposed substantially parallel to the connecting pipes 65, 75 extending in the left-right direction. Accordingly, the load detection sensors 10 and the connecting pipes 65, 75 can be arranged compactly.

In the present embodiment, the rotary shaft 81A of the operation knob 81 and the load detection portions 15 of the four load detection sensors 10 are arranged in positions shifted from each other in the front-rear direction and the upper-lower direction. Specifically, the rotary shaft 81A (operation knob 81) is disposed rearward and upward of the load detection sensors 10 when viewed from the left or right direction as shown in FIG. 10. To be more specific, the rotary shaft 81A is disposed in a position shifted from the rear right load detection sensor 10 in an obliquely rearward and upward direction.

In the present embodiment, part of the operation unit 8 and part of the right rear load detection sensor 10, to be more specific, the rotary shaft 81A of the operation knob 81 and the load detection portion 15 are so disposed as to lie over each other in the left-right direction. Specifically, the left end portion of the rotary shaft 81A on which the pinion gear 82 is provided is disposed at the same position in the left-right direction (in the rear link 7R) as that of the load detection portion 15 inserted in the through hole of the right rear link 7, when viewed from the front-rear direction as shown in FIG. 12.

With this arrangement of the operation knob 81 and the load detection sensor 10, interference between the operation knob 81 and the load detection sensor 10 can be suppressed. Moreover, the car seat 1 can be made more compact in the left-right direction in comparison with a configuration in which the operation unit 8 it its entirety and the right rear load detection sensor 10 in its entirety are disposed in positions shifted from each other without overlapping in the left-right direction.

With the configuration as described above, the following operations and advantageous effects can be achieved according to the present embodiment.

Since the rotary shaft 81A and the load detection portion 15 are disposed in positions shifted from each other in the front-rear and upper-lower directions, interference between the operation knob 81 and the load detection sensor 10 can be suppressed. Moreover, since a part of the operation unit 8 and a part of the right rear load detection sensor 10 are so disposed as to lie over each other in the left-right direction, the car seat 1 can be made more compact in the left-right direction.

Since the load detection sensors 10 are arranged on axes of rotation of the front and rear links 6, 7 on which the links are rotatable relative to the link support portions 52B (slide rails 5), the car seat 1 can be made more compact in the upper-lower direction as well, in comparison with a configuration in which the load detection sensors 10 are arranged below the front and rear links 6, 7.

Since the load detection sensors 10 are provided in joint shafts by which the front and rear links 6, 7 are rotatably supported on the link support portions 52B, the load detection sensors 10 can be incorporated in the linkage (height adjustment mechanism). Therefore, interference between the load detection sensors 10 and the front and rear links 6, 7 can be suppressed; thus, as the need to provide space for suppressing interference is obviated, the car seat 1 can be made more compact. Moreover, as the load detection sensors 10 are used as the joint shafts, the number of parts in the car seat 1 can be reduced.

Since the lower portion of the side frame 30 has a recess 37 provided to receive the sensor body 11 when the seat bottom is in the lowest position, interference between the side frame 30 and the load detection sensor 10 can be suppressed, and the height of the car seat 1 as measured when the seat bottom is in the lowest position can be made lower. Accordingly, the car seat 1, particularly, when the seat bottom is in the lowest position, can be made more compact in height.

Since the connecting pipes 65, 75 are attached to the front and rear links 6, 7 in such positions as to avoid the load detection sensors 10, interference between the load detection sensors 10 and the connecting pipes 65, 75 can be suppressed.

Since the front and rear links 6, 7 are provided rotatably on the load detection portions 15, the positions of the detection portions 15 will never change even when the linkage is actuated, and thus detection of the load can be done under the same conditions irrespective of the height position of the seat bottom. Accordingly, control exercised based upon the detection results of the load detection sensors 10 can be made more accurate.

Third Embodiment

Next, referring mainly to FIGS. 13-15, a third embodiment of the present invention will be described. In the following description, the same elements as those mentioned in the above-described embodiments will be designated by the same reference characters, and a description thereof will be omitted.

In the above-described second embodiment, an exemplary configuration has been explained in which load detection sensors 10 are provided in joint shafts by which the front and rear links 6, 7 are supported rotatably relative to the slide rails 5 (link support members). The present embodiment, as shown in FIG. 13, exemplifies a configuration in which load detection sensors 10, 20 are provided in the joint shafts by which the front and rear links 6, 7 are supported rotatably relative to the side frames 30.

A car seat 1 according to this embodiment mainly includes a seat back frame 2, a seat bottom frame 3, seat springs 4, slide rails 5, front links 6 and rear links 7, an operation unit 8, and load detection sensors 10, 20 as a detection sensor.

Figure 14:
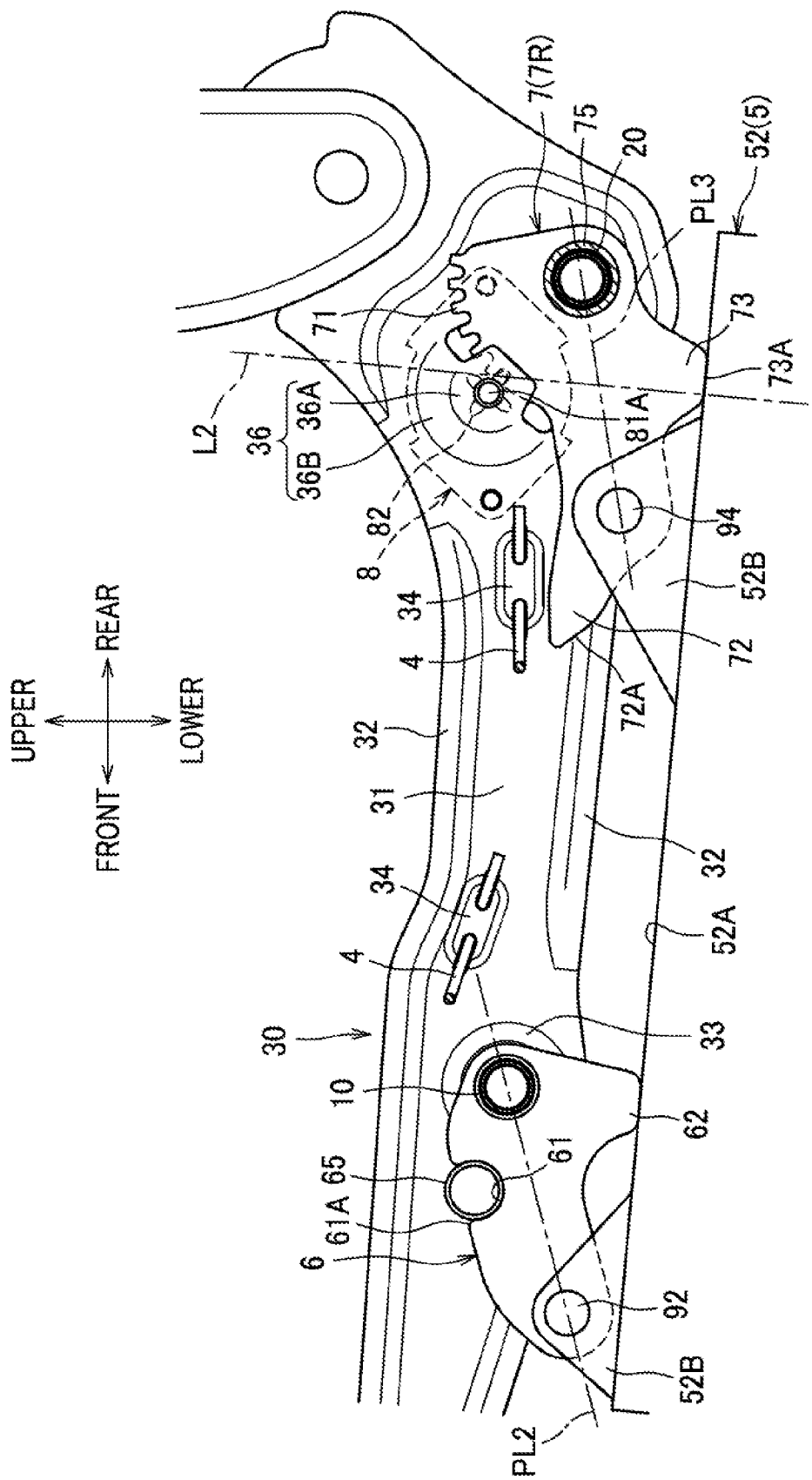
FIG. 14 is a side elevation of the car seat according to the third embodiment as viewed from an inner side.

As shown in FIG. 14, the front link 6 is joined at its front end portion (at the front in the drawing) to the front link support portion 52B by a pin 92 which forms a nodal point therein. The pin 92 supports the front link 6 in a manner that permits the front link 6 to rotate, and thus the front link 6 is rendered rotatable relative to the link support portion 52B (slide rail 5).

The rear end portion (at the rear in the drawing) of the front link 6 is joined to the bottom wall of the link mount recess portion 33 to form a nodal point in a front portion of the side frame 30 (main body portion 30A) by a load detection sensor 10. The load detection sensor 10 supports the front link 6 in a manner that permits the front link 6 to rotate, and thus the front link 6 is rendered rotatable relative to the side frame 30.

The load detection sensor 10 of the present embodiment is provided one for each front link 6 (the total two) in a joint shaft by which the front link 6 is supported rotatably relative to the side frame 30. In the present embodiment as well, the front link 6 has the same configuration as in the second embodiment, such that the front link 6 is provided rotatably on the load detection portion 15.

The load detection sensor 10 in the present embodiment is so arranged that its lateral orientation is reverse to that shown in the second embodiment. To be more specific, referring to FIG. 12, the load detection sensor 10 in the present embodiment is attached to the front link 6 by inserting the tubular sheath 14 in the through hole provided in the front link 6, and fixed to the side frame 30 by inserting the extended shaft portion 12 in the through hole provided in the side frame 30 and screwing a nut 95 on the external thread 12A. In this way, the load detection sensor 10 is disposed with the sensor body 11 facing inward in the left or right direction and the extended shaft portion 12 facing outward in the left or right direction.

Returning to FIG. 14, the rear link 7 is joined at its front end portion (at the front in the drawing) to the rear link support portion 52B by a pin 94 which forms a nodal point. The pin 94 supports the rear link 7 in a manner that permits the rear link 7 to rotate, and thus the rear link 7 is rendered rotatable relative to the link support portion 52B (slide rail 5).

The rear end portion (at the rear in the drawing) of the rear link 7 is joined to the inner side of the fixing wall 31 which inner side faces inward in the left-right direction to form a nodal point in a rear portion of the side frame 30 (main body portion 30A) by a detection sensor 20. The load detection sensor 20 supports the rear link 7 in such a manner that permits the rear link 7 to rotate, and thus the rear link 7 is rendered rotatable relative to the side frame 30.

Figure 15:
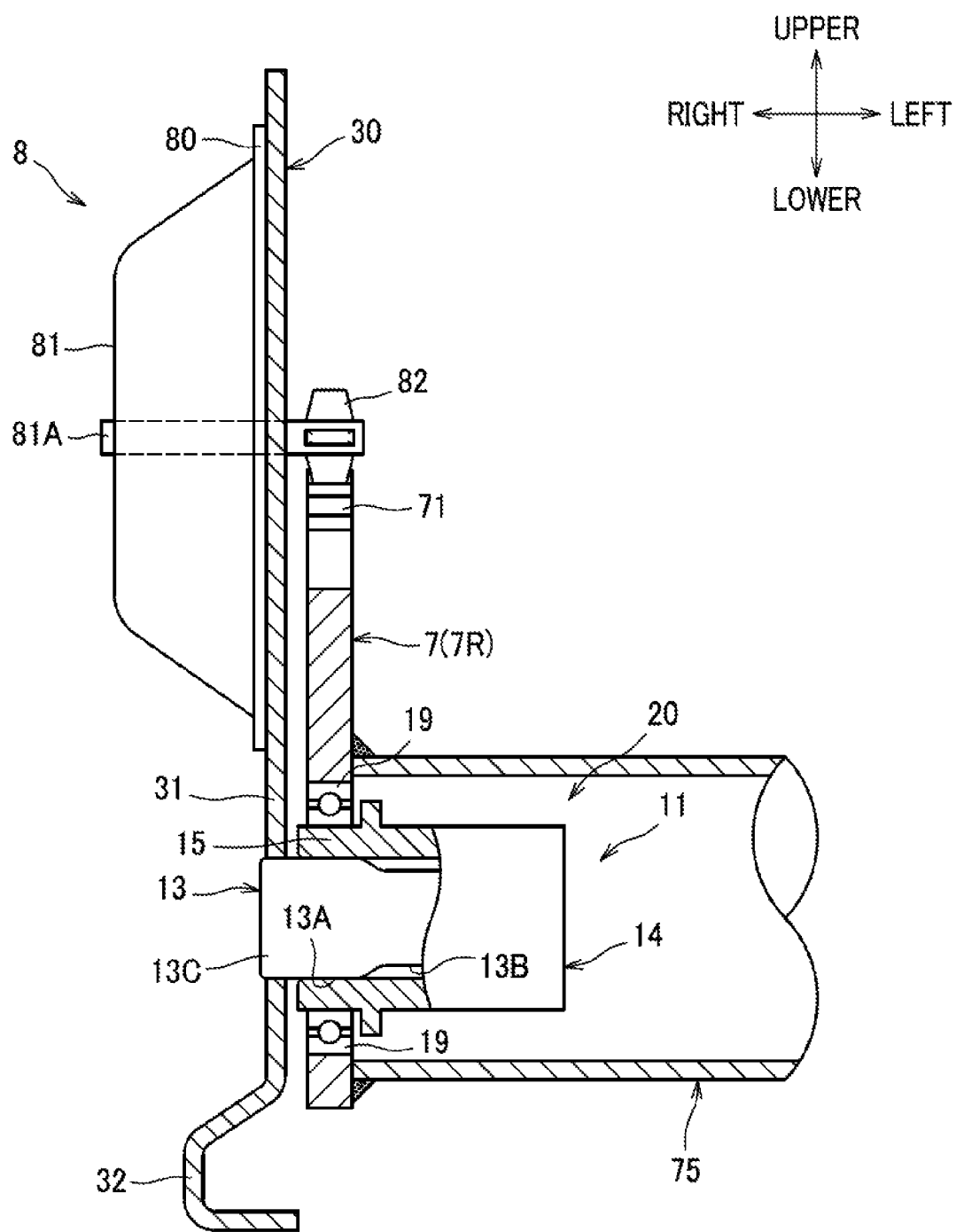
FIG. 15 is a sectional view taken along line Y-Y of FIG. 14.

As shown in FIG. 15, the load detection sensor 20 is a sensor, similar to the load detection sensor 10, which determines a load imposed when an occupant is seated on the car seat 1, and comprises a sensor body 11 which is configured to mainly include a stowed shaft portion 13, a tubular sheath 14, a strain gage and a substrate unit both of which are not shown in the drawing.

The stowed shaft portion 13 of the load detection sensor 20 includes, other than the large-diameter portion 13A and the small-diameter portion 13B, an extension portion 13C extending from the large-diameter portion 13A outward in the left or right direction (to the outside of the tubular sheath 14).

The load detection sensor 20 as described above is attached to the car seat 1 with the axial direction of the sensor body 11 extending substantially along the left-right direction. Furthermore, the load detection sensor 20 is configured as a joint shaft by which the rear link 7 is supported rotatably relative to the side frame 30, and provided one for each rear link 7 (total two).

To be more specific, the load detection sensor 20 is attached to the rear link 7 by inserting the tubular sheath 14 (load detection portion 15) via the ball bearings 19 in the through hole provided in the rear link 7, and fixed to the side frame 30 by press-fitting the extension portion 13C in the through hole provided in the side frame 30. In the present embodiment, as well, the rear link 7 is provided rotatably on the load detection portion 15.

The load detection sensor 20 attached to the car seat 1 is configured such that its major portion (the portion other than the extension portion 13C) protrudes from the side frame 30 in one of the left and right directions that faces inward. In other words, the protruding portion of the load detection sensor 20 which protrudes from the side frame 30 is disposed on the inner side of the side frame 30 which inner side faces in the left or right direction.

In the present embodiment, as well, the left and right rear links 7 are connected with each other by a substantially cylindrical (tubular) connecting pipe 75 which extends from one side frame 30 to the other side frame 30. The load detection sensor 20 is disposed in part (specifically, a portion protruding from the rear link 7 to the inside in the left-right direction), at the inside of the connecting pipe 75.

With this configuration, the rear link 7 can be made smaller in size in comparison with a configuration in which the load detection sensor 20 is disposed at the outside of the connecting pipe 75, and thus the car seat 1 can be made more compact. Moreover, as part of the load detection sensor 20 is disposed inside the connecting pipe 75, the load detection sensor 20 can be protected by the connecting pipe 75.

Figure 13:
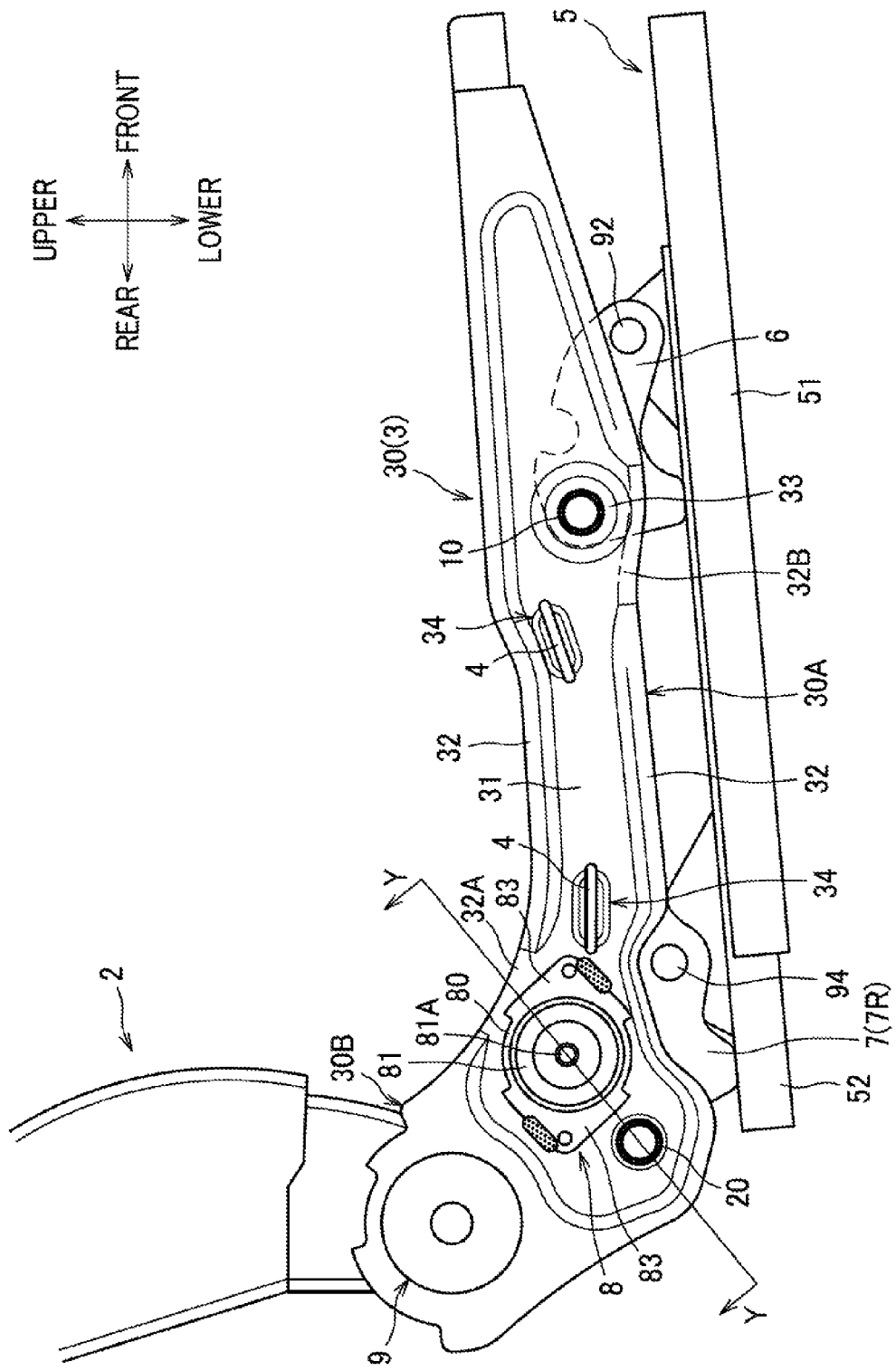
FIG. 13 a side elevation of a car seat according to a third embodiment as viewed from an outer side.

The operation unit 8 is fixed, as in the second embodiment, to a rear portion of an outer surface of the right side frame 30 which is one of the sides facing in the left-right direction, and mainly includes a base portion 80, an operation knob 81, a pinion gear 82, and a fixing portion 83 (see FIG. 13).

As shown in FIG. 13, in the present embodiment as well, the rotary shaft 81A of the operation knob 81 and the load detection sensors 10, 20 (load detection portions 15) are in positions shifted from each other in the front-rear direction and in the upper-lower direction. Furthermore, as shown in FIG. 15, the left end portion of the rotary shaft 81A of the operation knob 81 (part of the operation unit 8) and the load detection portion 15 of the right load detection sensor 20 (part of the load detection sensor 20) are so disposed on the rear link 7R as to overlap each other in the left-right direction.

Furthermore, as shown in FIG. 14, in the present embodiment, the rotary shaft 81A is disposed in a position between the two nodal points (the pin 94 and the load detection sensor 20) of the rear link 7R in the front-rear direction and higher than the load detection sensor 20 (load detection portion 15), when the seat bottom is in the lowest position.

With this configuration, the side frame 30 can be downsized in the front-rear direction while interference between the rotary shaft 81A of the operation unit 8 and the rear link 7R which would occur when the seat bottom is in the lowest position can be suppressed.

To elaborate, an arrangement as a conceivable configuration for suppressing interference between the rotary shaft 81A and the rear link 7R may be such that the rotary shaft 81A (operation unit 8) is disposed frontward or rearward of the rear link 7R, but this configuration would possibly cause the side frame 30 to become larger in the front-rear direction. With this in view, in the present embodiment, the rotary shaft 81A is disposed between the two nodal points of the rear link 7R and at a level higher than that of the load detection portion 15, so that the side frame 30 can be made smaller while suppressing the interference. Accordingly, the car seat 1 can be made more compact in the front-rear direction.

In the present embodiment, the rotary shaft 81A is disposed in a position between the pin 94 and the load detection sensor 20 in the front-rear direction, and at a level higher than that of the load detection sensor 20 when the seat bottom is in the highest position (for the position of the load detection sensor 20, see the position of the pin 93 shown in FIG. 7(*b*)). In other words, in the car seat 1 according to the present embodiment, the rotary shaft 81A is always in a position between the pin 94 and the load detection sensor 20 in the front-rear direction, and at a level higher than that of the load detection sensor 20 irrespective of the height position of the seat bottom.

As shown in FIG. 15, the operation unit 8 is so attached to the side frame that the operation knob 81 (the portion protruding from the side frame 30) is in a laterally outside position of the side frame 30. Therefore, in the present embodiment, the protruding portion (operation knob 81) of the operation unit 8 and the protruding portion (sensor body 11) of the load detection sensor 20 are positioned on the opposite sides with respect to the side frame 30.

With this configuration, interference between the operation unit 8 (operation knob 81) and the load detection sensor 20 (sensor body 11) can be suppressed. To be more specific, the operation knob 81 and the sensor body 11 can be so arranged that at least parts of them are laid over (overlap) each other as viewed from the left-right direction, and thus the side frame 30 can be made more compact. As a consequence, the car seat 1 can be made more compact in size.

According to the present embodiment as described above, the following operations and advantageous effects can be achieved.

Since the rotary shaft 81A and the load detection portion 15 are disposed in positions shifted from each other in the front-rear direction and the upper-lower direction, interference between the operation unit 8 and the load detection sensor 20 can be suppressed. Moreover, since part of the operation unit 8 and part of the load detection sensor 20 are so disposed as to overlap in the left-right direction, the car seat 1 can be made more compact in the left-right direction.

Since the load detection sensors 10, 20 are provided in the joint shafts of the front and rear links 6, 7 joined with the side frame 30, the car seat 1 can be made more compact, and the number of parts of the car seat 1 can be reduced.

In the present embodiment, also, the load detection sensors 10, 20 as joints shaft are, as a matter of course, arranged on the axes of rotation of the front and rear links 6, 7 pivoted on the side frame 30, and thus the car seat 1 can also be made compact in size in the upper-lower direction.

Since the rotary shaft 81A of the right load detection sensor 20 is disposed in a position between the two nodal points of the rear link 7R in the front-rear direction, and at a level higher than that of the load detection portion 15, interference between the rotary shaft 81A and the rear link 7R can be suppressed, and the side frame 30 can be downsized in the front-rear direction. Accordingly, the car seat 1 can be made more compact in the front-rear direction.

Since the protruding portion of the operation unit 8 is positioned laterally outside of the side frame 30, and the protruding portion of the right load detection sensor 20 is positioned laterally inside of the side frame 30, interference between the operation unit 8 and the load detection sensor 20 can be suppressed. Moreover, since the operation unit 8 and the load detection sensor 20 can be so arranged as to partially overlap each other, the side frame 30 and the car seat 1 can be made more compact. Furthermore, since the protruding portion of the load detection sensor 20 is positioned at an inner side of the side frame 30, the load detection sensor 20 can be protected by the side frame 30 without any additional part.

Since part of the load detection sensor 20 is disposed at an inner side of the side frame 30, the rear link 7 can be downsized, and the car seat 1 can be made more compact. Moreover, the load detection sensor 20 can be protected by the connecting pipe 75.

Since the front and rear links 6, 7 are provided rotatably on the load detection portion 15, the load can be detected under the same conditions, independent of the height position of the seat bottom. Accordingly, the control exercised based upon the detection results of the load detection sensors 10, 20 can be improved in accuracy.

Fourth Embodiment

Next, referring mainly to FIG. 16, a fourth embodiment of the present invention will be described. It is to be understood that elements designated by the same reference characters in FIG. 16(*b*) as those used in the above-described embodiments and in FIG. 16(*a*) should be construed to have the same configurations as those of the elements described in the above-described embodiments and FIG. 16(*a*), and thus a detailed description will be omitted.

In the above-described third embodiment, an exemplary configuration in which the front and rear load detection sensors 10, 20 are both provided in the joint shafts pivoted on the side frame 30 is described. The present embodiment shows, as seen in FIG. 16, a configuration in which one of the front and rear load detection sensors 10 is provided in the joint shaft on the side frame 30 while the other is provided in the joint shaft on the slide rail 5 (link support member).

To be more specific, in a car seat 1 as shown in FIG. 16(*a*), the front load detection sensor 10 (10A) is provided in a joint shaft by which the front link 6 is pivoted on the side frame 30. On the other hand, the rear load detection sensor 10 is provided in a joint shaft by which the rear link 7 is pivoted on the rear link support portion 52B (slide rail 5).

In contrast, in a car seat 1 as shown in FIG. 16(*b*), the front load detection sensor 10 is provided in a joint shaft by which the front link 6 is pivoted on the front link support portion 52B (slide rail 5); the rear load detection sensor 10 (10A) is provided in a joint shaft by which the rear link 7 is pivoted on the side frame 30.

Although the embodiment shown in FIG. 16 (*a*) (and the first to third embodiments described above) shows a configuration in which the operation unit 8 is attached to the rear portion of the side frame 30, the embodiment shown in FIG. 16 (*b*) shows a configuration in which the operation unit 8 is attached in a front portion (region on the front side with respect to its center in the front-rear direction) of the side frame 30. In other words, the present invention encompasses configurations in which the operation unit 8 is attached to the front portion of the side frame 30.

In the embodiment shown in FIG. 16 (*b*), the right front link 6 is provided with a sector gear 71 in mesh with a pinion gear 82, so that the rotation of the operation knob 81 causes the front link 6 to make a rotational motion first, and in conjunction with this rotation, the rear link 7 makes a rotational motion (thus causes the linkage to be actuated).

Hereupon, in the present embodiment, the load detection sensor 10A is provided in a joint shaft by which a farther link is pivoted on the side frame 30 which farther link is one of the front and rear links 6, 7 located in a position farther from the operation unit 8 in the front-rear direction.

More specifically, in a configuration with the operation unit 8 attached to the rear portion of the side frame 30 as shown in FIG. 16 (*a*), the load detection sensor 10A is provided in a joint shaft by which the front link farther from the operation unit 8 is pivoted on the side frame 30. On the other hand, in a configuration with the operation unit 8 attached to the front portion of the side frame 30 as shown in FIG. 16 (*b*), the load detection sensor 10A is provided in a joint shaft by which the rear link 7 farther from the operation unit 8 is pivoted on the side frame 30.

With this arrangement of the load detection sensor 10A as a joint shaft for the front link 6 or the rear link 7 to be joined with the side frame 30, advantageously in particular for the right side frame 30 to which the operation unit 8 is fixed, interference between the load detection sensor 10A and the operation unit 8 can be suppressed, and both of the operation unit 8 and the load detection sensor 10A can be provided in one side frame without upsizing the side frame 30.

To elaborate, if the load detection sensor 10A and the operation unit 8 are disposed in positions, closer to each other, of one side frame 30, the side frame 30 would possibly be required to be made larger in size in order to avoid interference. In the present embodiment, the load detection sensor 10A is provided in a joint shaft for the farther link that is a link farther from the operation unit 8, and thus upsizing of the side frame 30 is by no means required. Also, since no space for avoiding interference is required, the side frame 30 can be downsized as the case may be; therefore, the car seat 1 can be made more compact.

Furthermore, with the configuration proposed in the present embodiment, as the operation unit 8 and the load detection sensor 10A are disposed in positions remote from each other in the front-rear direction, the operation unit 8 and the load detection sensor 10A can be mounted to the side frame 30 with increased ease.

In the present embodiment, arrangement of two load detection sensors 10 at the left side frame 30 to which no operation unit 8 is fixed is optional.

Hereupon, in all of the first to fourth embodiments described above, the operation unit 8 is disposed near the rear link 7 (or the front link 6). With this arrangement, the number of parts of a structure for actuating the linkage can be reduced and the parts for transmitting the actuating motions can be downsized, and the force applied to the operation knob 81 can be transmitted to the rear link 7 (or the front link 6) with increased ease, in comparison with a configuration in which the operation unit 8 is disposed remote from the rear link 7 (or the front link 6), for example, in a position between the pins 91, 93 in FIGS. 2, 10, 16.

To elaborate, with an alternative configuration in which the operation unit 8 is disposed remote from the links 6, 7, other parts would be necessitated, for example, between the pinion gear 82 and the sector gear 71, for transmitting a force applied by rotating the operation knob 81 to the links 6, 7, and the number of parts would thus be increased, or the parts, such as gears for transmitting such an actuating force would possibly need to be made larger. Moreover, transmission of the force applied by rotating the operation knob 81 would become difficult, so that a greater force would possibly be required for manipulating the operation knob 81.

Furthermore, in all of the second to fourth embodiments described above, as the load detection sensors 10, 20 are provided in joint shafts by which the links 6, 7 are pivoted on the side frame 30 (or the slide rail 5), the car seat 1 can be made more compact, and the load detection sensors 10, 20 and the links 6, 7 can be arranged in a compact space.

In particular, besides the advantages such as the reduction in the number of parts and the compactness in arrangement, achieved by the close arrangement of the both of the operation unit 8 and the load detection sensor 20 relative to the rear link 7 (link) as described in relation to the third embodiment (see FIG. 13), the rigidity of the link can be enhanced. Accordingly, the stability of the motions of the links to which the load is applied can be improved.

Although various embodiments of the present invention have been described above, the present invention is not limited to the above-described embodiments. Specific configurations may be modified, where appropriate, without departing from the gist of the present invention.

In the above-described embodiments, the flange portion 32 (reinforcing portion) is configured to have a U-shaped cross section, but the present invention is not limited to this configuration. For example, the flange portion may be configured to have an L-shaped cross section formed with a bottom wall of a recessed portion by bending the peripheral portion of the side frame inward or outward in the left-right direction once.

In the above-described embodiments, the link mount recess portion 33 (recessed portion) is provided to partially overlap the lower gap portion 32B (second gap portion), but the present invention is not limited to this configuration. For example, referring to FIG. 2, the link mount recess portion 33 may be provided to face the lower gap portion 32B, specifically to contact a chain line shown in FIG. 2. With this alternative configuration, the side frame can be made compact in height in comparison with a configuration in which the lower gap portion 32B is not provided and the link mount recess portion 33 is provided in a position closer to the flange portion 32.

In the above-described embodiments, the link mount recess portion 33 is so provided as to lie over the lower gap portion 32B, but the present invention is not limited to this configuration. For example, referring to FIG. 2, the link mount recess portion 33 may be provided between the upper and lower flange portions 32 with no lower gap portion 32B provided in the flange portion 32. With this alternative configuration as well, the side frame 30 can be enhanced in rigidity. Furthermore, the front link 6 is joined to the rigidity-enhanced portion, and thus the motion of the front link 6 can be stabilized.

In the above-described embodiments, the seat springs 4 are arranged to span between the main body portions 30A of the left and right side frames 30, but the present invention is not limited to this configuration. For example, the seat springs may be provided to span substantially parallel to the left and right side frames in the front-rear direction. In this embodiment, the end portions of the seat springs may, for example, be attached to a frame or a pipe laid between the left and right side frames 30.

In the above-described embodiments, the seat springs 4 are illustrated as an occupant support member by way of example, but the present invention is not limited to this configuration. For example, the occupant support member may be a pan frame laid between the left and right side frames.

In the above-described embodiments, the slide rails 5 configured to make the seat bottom movable frontward and rearward are illustrated as a link support member (a member configured to support the links 6, 7), but the present invention is not limited to this configuration. For example, the link support member may be a link support metal part (hardware) fixed to the floor of a vehicle, or the floor of the vehicle on which a structure for supporting links are integrally provided.

In the above-described embodiments, the first stopper portion 72 is provided on a front end of the link that is opposite, with respect to the pin 94, to a rear end thereof on which a sector gear 71 is provided, but the present invention is not limited to this configuration. For example, referring to FIG. 4, the first stopper portion 72 may be provided on a lower side of the link that is opposite, with respect to the pins 93, 94 (plane PL3), to an upper side thereof on which the sector gear 71 is provided. With this configuration, the first stopper portion 72 and the sector gear 71 can be arranged farther away from each other, so that the effect of the load given to the first stopper portion 72 on the sector gear 71 can be reduced.

In the above-described embodiments, the second stopper portion 73 is provided on a side opposite, with respect to the pins 93, 94 (plane PL3), to a side on which the sector gear 71 is provided, but the present invention is not limited to this configuration. For example, referring to FIG. 4, the second stopper portion 73 may be provided on a side opposite, with respect to at least one of the pins (center of rotation), to a side on which the sector gear 71 is provided.

Specific configurations of the links shown in the above-described embodiments are exemplary only, and the present invention is not limited to this specific configuration shown in the above-described embodiments. For example, in the above-described embodiments, the left and right rear links 7 have shapes different from each other, but the present invention is not limited to this configuration; thus, the left and right rear links 7 may be formed to be bilaterally symmetrical so that the operation unit 8 may be fixed to either of the left and right side frames 30 to allow the linkage to be actuated even when the operation unit 8 is fixed to either one of the left and right side frames 30.

In the above-described embodiments, the first stopper portion 72 configured to restrict actuation of the four-bar linkage when the side frame 30 is in the highest position is provided on the rear link 7R, but the present invention is not limited to this configuration. For example, the first stopper portion and the second stopper portion may be provided on the front link 6 (at least one of the front links 6) as provided in the above-described embodiments. The stopper portion consistent with the present invention may be sufficient if it is provided only on the rear link 7R provided with the sector gear 71 (second gear).

In the above-described embodiments, the generally hollow cylindrical (tubular) connecting pipes 65, 75 are illustrated as an example of the connecting member, but the present invention is not limited to this configuration; for example, a connecting member having the shape of a solid circular cylinder or a prism may be adopted. In the above-described third embodiment, the rear load detection sensor 20 is provided inside the connecting pipe 75, but the present invention is not limited to this configuration; for example, the front load detection sensor 10 may also be provided inside a pipe-like connecting member.

In the above-described embodiments, the connecting pipes 65, 75 as a connecting member are fixed (attached) to the front link 6 or the rear link 7 by welding, but the present invention is not limited to this configuration. For example, the connecting member may be fixed by adhesive, or may be attached by press-fitting in a through hole provided in the link, or may be attached to the link by a bolt or other fastening hardware.

In the present embodiments, the recessed portion 61 of the front link 6 is shaped generally like a segment of a circle as viewed from the left-right direction, but the present invention is not limited to this configuration. That is, the shape of the recessed portion may be modified appropriately so as to conform to the shape of the connecting member.

In the above-described embodiments, the operation unit 8 is so arranged that the weld W1 at the front fixing portion 83 is in a position near the engaging portion 34 and the weld W2 of the rear fixing portion 83 is in a position near the reclining mechanism 9, but the present invention is not limited to this arrangement. For example, as indicated by a chain line in FIG. 3, the operation unit 8 may be so arranged that the weld W1' of the front fixing portion 83 is in a position near the flange portion 32 and the weld W2' of the rear fixing portion 83 is in a position near the pin 93. In this arrangement as well, the side frame 30 can be enhanced in rigidity.

Figure 8:
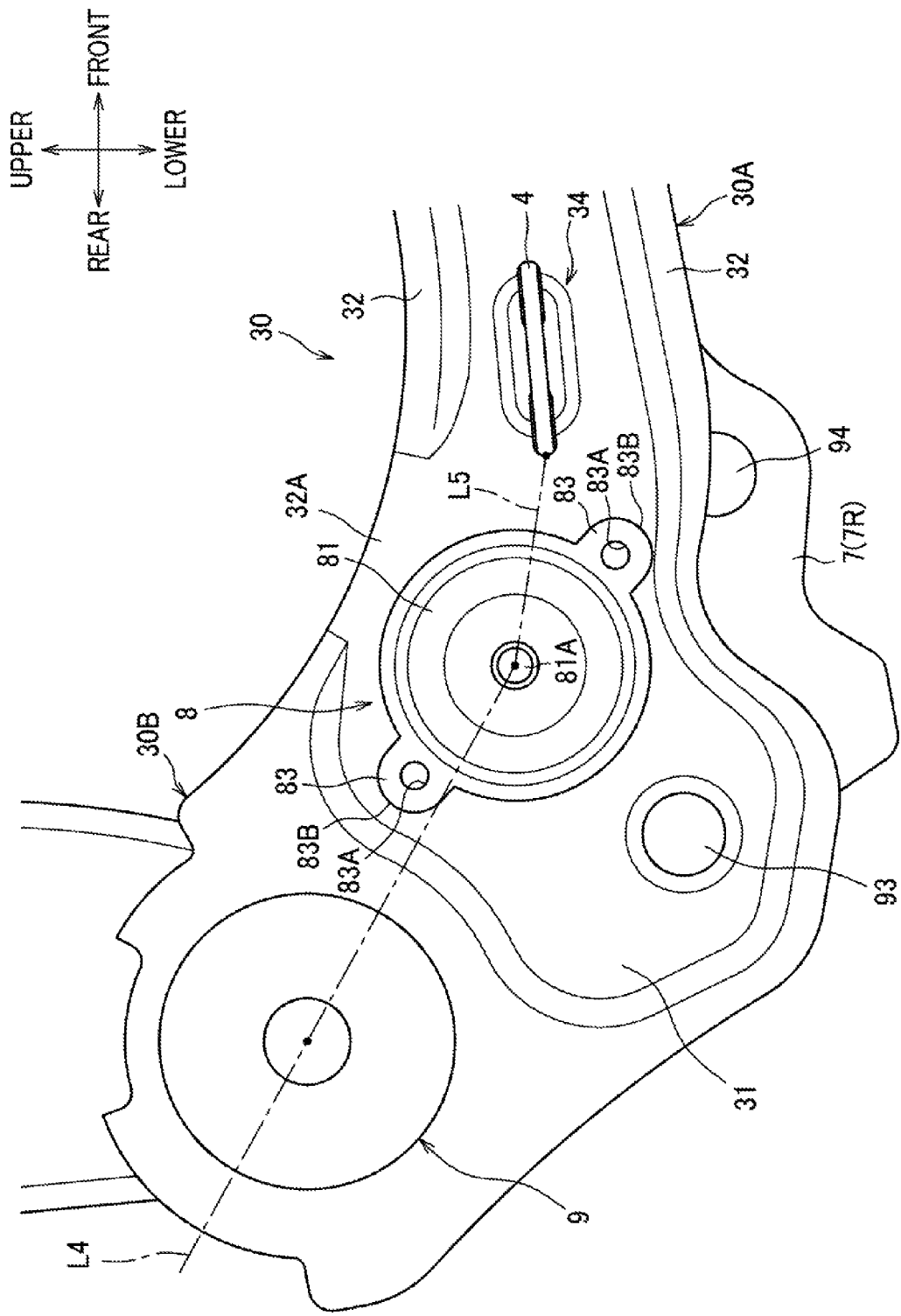
FIG. 8 is an enlarged view of the operation unit and therearound of the car seat according to a modified example.

In the above-described embodiments, as shown in FIG. 3, the operation unit 8 may be so arranged that the end 83B of the rear fixing portion 83 is positioned below the line L4 and the end 83B of the front fixing portion 83 is positioned above the line L5, but the present invention is not limited to this arrangement. For example, as shown in FIG. 8, the operation unit 8 may be so arranged that the end 83B of the rear fixing portion 83 is positioned to avoid the line L4 above the line L4 and the end 83B of the front fixing portion 83 is positioned to avoid the line L5 below the line L5. With this arrangement, the reclining mechanism 9, the operation unit 8 and the rear engaging portion 34 can be arranged in positions closer to each other in the front-rear direction, and thus the side frame 30 can be made more compact in the front-rear direction. In FIG. 8, illustration of welds is omitted.

In the above-described embodiments, the operation unit 8 is so arranged that the rotary shaft 81A of the operation knob 81 is positioned rearward of the seat springs 4, but the present invention is not limited to this arrangement. For example, the whole operation unit 8 configured according to the above-described embodiments may be disposed rearward of the seat springs 4 (occupant support member).

With this alternative configuration, the pinion gear 82 and other parts can be disposed farther away from a portion of the seat bottom for an occupant to sit thereon, and thus the feel of seating can be kept more comfortable. Since the operation unit 8 is disposed further rearward, the overlapping region of the operation unit 30B which overlaps the mount portion 30B can be increased, and thus the main body portion 30A can be made lower in profile, so that the side frame 30 can be made more compact in height.

In the above-described embodiments, the operation unit 8 is so disposed that a part thereof lies over the upper gap portion 32A (first gap portion), but the present invention is not limited to this arrangement. For example, referring to FIG. 3, the operation unit 8 may be so disposed as to face the upper gap portion 32A, specifically, in contact with a chain line shown in FIG. 3. With this configuration, the side frame 30 can be made more compact in height in comparison with a configuration in which the upper and lower flange portions 32 are provided and the operation unit 8 is in a position closer to the upper flange portion 32.

In the above-described embodiments, the operation unit 8 is provided with two fixing portions 83, but the present invention is not limited to this configuration. For example, only one fixing portion may be provided, or three or more fixing portions may be provided. The present invention is not limited to a specific shape of the fixing portion 83, which may for example have a generally elongate semicircular shape as shown in FIG. 8.

Specific configurations of the operation unit 8 as illustrated in relation to the above-described embodiments are exemplary only, and the present invention is not limited to the configurations of the above-described embodiments. For example, the above-described embodiments show a configuration in which the pinion gear 82 (first gear) is rotatable coaxially with the operation knob 81 (operation member), but the present invention is not limited to this configuration. For example, a gear (first gear) in mesh with a gear at the link may be so provided as to be in mesh, directly or via other gear(s), with a gear rotatable coaxially with an axis of rotation of the operation member.

In the above-described embodiments, the positioning hole 35 (through hole) of the side frame 30 is larger than the positioning hole 83A (through hole) of the fixing portion 83, but the present invention is not limited to this configuration; another configuration may be feasible in which the positioning hole of the fixing portion is larger than the positioning hole of the side frame.

In the above-described embodiments, the operation unit 8 is attached to the rear portion of the side frame 30, but the present invention is not limited to this configuration: for example, it may be attached to a center or a portion around the center in the front-rear direction, or to a front portion of the side frame. In this alternative configuration, the link directly driven by an operation through the operation member may not be the rear link 7 (7R) as in the above-described embodiment, but may be the front link 6. That is, a structure such as the sector gear 71 in the above-described embodiment may be provided on the front link 6.

In the above-described embodiments, the operation unit 8 is attached to the right side frame 30, but the present invention is not limited to this configuration; it may be attached to the left side frame 30. According to the present invention, the operation unit may be provided on the both of the left and right side frames.

In the above-described embodiments, the operation knob 81 is exemplified as one provided with a height mechanism operation lever (i.e., a lever-type operation member), but the present invention is not limited to this type, for example, a dial-type operation member may also be adopted.

In the above-described embodiments, the height adjustment for lifting or lowering the left and right side frames 30 is exemplified by a four-bar linkage, but the present invention is not limited to this configuration. For example, the height adjustment mechanism may be embodied as a mechanism configured to lift or lower the side frames by a motorized, hydraulic, or pneumatic scheme.

Specific configuration of the side frame 30 as shown in relation to the above-described embodiments is exemplary only, and the present invention is not limited to the configuration of the above-described embodiments. For example, referring to FIG. 15, the side frame 30 (fixing wall 31) is formed to extend straight in an upper-lower direction in cross section according to the above-described embodiment, but not limited to this configuration; the cross-sectional profile thereof may be formed by bending such that its upper portion to which the operation unit 8 is fixed is disposed on the laterally outer side (right side) and its lower portion to which a load detection sensor 20 is attached is disposed on a laterally inner side (left side).

In the alternative configuration with the side frame formed by bending as described above, if the protruding portion of the detection sensor is disposed on an inner side of the side frame as in the third embodiment, the load detection sensor 20 can be protected by the side frame 30. Alternatively, if the protruding portion of the detection sensor (sensor body 11) is disposed on an outer side of the side frame as in the first embodiment, the amount of laterally outward protrusion of the detection sensor can be suppressed because the portion of the side frame on which the detection sensor is attached is bent in one of the left and right directions which faces inward.

In the above-describe embodiments, the front link 6 and the rear link 7 (link) are rendered rotatable on the load detection portions 15 (detection part) by providing the ball bearings 19 (rolling-element bearings) in the through hole provided in the link, but the present invention is not limited to this configuration. For example, the link may be provided rotatably on the detection part by providing needle bearings or the like as rolling-element bearings in the through hole provided in the link. Moreover, a collar made of metal or resin may be provided in the through hole provided in the link so that the link is rendered rotatable on the detection part. Furthermore, the link and the detection part may be running-fitted so that the link is rendered rotatable on the detection part. Furthermore, the link may be provided so as not to rotate relative to the detection sensor (i.e., may be fixed thereto) as long as this will not affect the accuracy in detection of the detection sensor.

In the above-described third embodiment, the rotary shaft 81A of the operation unit 8 is disposed between the pin 94 and the load detection sensor 20 in the front-rear direction and at a level higher than that of the load detection sensor 20 in an entire range of upward-downward movement of the seat bottom, but the present invention is not limited to this arrangement. For example, the rotary shaft 81A may be disposed between the pin 94 and the load detection sensor 20 in the front-rear direction and at a level higher than that of the load detection sensor 20 only when the seat bottom is in the lowest position and thus the rotary shaft 81A is likely to interfere with the rear link 7R.

In the above-described embodiments, the total four load detection sensors 10, 20 (detection sensor) are provided, but the present invention is not limited to this configuration. That is, the number of detection sensors is not limited to a specific one, but the present invention may be applicable to a vehicle seat including at least one detection sensor. Thus, the number of the detection sensor may be three or less, or may be five or more.

Specific configurations of the load detection sensors 10, 20 shown in relation to the above-described embodiments are exemplary only, and the present invention is not limited to the configurations in the above-described embodiments. For example, the load detection sensors 10, 20 are configured such that each of their sensor bodies 11 includes a stowed shaft portion 13 and a tubular sheath 14, but the present invention is not limited to this configuration; the sensor body may be shaped like a shaft. In the above-described embodiment, the strain gage is adopted as a sensing element, but the present invention is not limited to this configuration; a Hall IC or the like may be adopted instead.

In the above-described embodiments, the load detection sensors 10, 20 are provided in the joint shafts by which the front and rear links 6, 7 are supported rotatably relative to the side frames 30 or the slide rails 5 (link support member), but the present invention is not limited to this configuration. For example, the detection sensor may not be a member by which the link and the side frame or the link support member are supported rotatably relative to each other. To be more specific, referring to FIG. 12, in which the rear link 7 and the link support portion 52B are supported rotatably relative to each other by a pin, the detection sensor may be disposed adjacent to the pin on an axial line of the pin.

In the above-described embodiments, the load detection sensors 10, 20 are attached with the axial direction of their sensor bodies 11 extending along the left-right direction (horizontal direction), but the present invention is not limited to this configuration. For example, the load detection sensor may be of a type whose detection part is shaped like a shaft extending along the upper-lower direction (vertical direction).

It is to be understood that the present invention is particularly advantageous when it is implemented in a detection sensor having a shaft-like detection part attached with its axial direction extending along the left-right direction (hereinafter referred to as horizontal-type sensor for convenience of explanation). To be more specific, this is because a detection sensor having a shaft-like detection part attached with its axial direction extending along the upper-lower direction (hereinafter referred to as vertical-type sensor) would possibly cause the vehicle seat to become upsized in height by the dimension in the upper-lower direction (height) of the sensor, while the horizontal-type sensor would have no such possibility, and thus the vehicle seat can be made more compact in height, too.

On the other hand, the horizontal-type sensor would, in many cases, have a dimension in the left-right direction, greater than that of the vertical-type sensor; therefore, if the horizontal-type sensor is attached to the vehicle seat, the vehicle seat would possibly become larger in the left-right direction, in comparison with a configuration in which the vertical-type sensor is attached thereto. Therefore, if the horizontal-type sensor is adopted, the advantage of the present invention characterized in compactness in the left-right direction of the vehicle seat will be of a particularly great significance.

In the above-described embodiments, a detection sensor is exemplified by the load detection sensors 10, 20 configured to detect a load, but the present invention is not limited to this configuration. For example, the detection sensor may be a position sensor configured to detect a position of the seat bottom, specifically, the position in the front-rear direction, or the position in height, etc.

In the above-described embodiments, the rotary shaft 81A of the operation knob 81 (operation member) and the load detection portion 15 (detection part) are disposed in positions shifted from each other in both of the front-rear and upper-lower directions, but the present invention is not limited to this configuration. For example, the rotary shaft of the operation member and the detection part may be disposed in such positions that they overlap each other in the front-rear direction and are shifted from each other only in the upper-lower direction. Alternatively, the rotary shaft of the operation member and the detection part may be disposed in such positions that they overlap each other in the upper-lower direction and are shifted from each other only in the front-rear direction.

Particularly, with a configuration in which the operation unit 8 and the load detection sensors 10, 20 are both attached to the side frame 30, arrangement of the rotary shaft and the detection part in positions shifted from each other in at least one of the front-rear and upper-lower directions as in the third embodiment makes it possible to reduce the thickness of the side frame (reduce the dimension in the left-right direction) in comparison with the configuration in which the rotary shaft and the detection part are so disposed as to overlap each other in the front-rear and upper-lower directions. Accordingly, the vehicle seat can be made more compact in the left-right direction. Furthermore, according to the present invention, the flexibility in arrangement of the operation unit and the detection sensor can be increased, in comparison with the configuration in which the rotary shaft and the detection part are so disposed as to overlap each other in the front-rear and upper-lower directions.

In the above-described embodiments, part of the operation unit 8 and part of the load detection sensor 10, 20 (detection sensor) are so disposed as to overlap each other in the left-right direction. In other words, the detection sensor is so disposed that a part thereof is within the width in the left-right direction of the operation unit. However, the present invention is not limited to this arrangement. For example, the detection sensor in entirety may be disposed within the width in the left-right direction of the operation unit. With this configuration, the vehicle seat can be made more compact in the left-right direction.

In the above-described embodiments, a car seat 1 for a car such as an automobile is illustrated by way of example as an application of a vehicle seat, but the present invention is not limited to this application, and can also be applied to any other type of vehicle seat, for example, a seat for a ship or for an aircraft.

Figure 17:
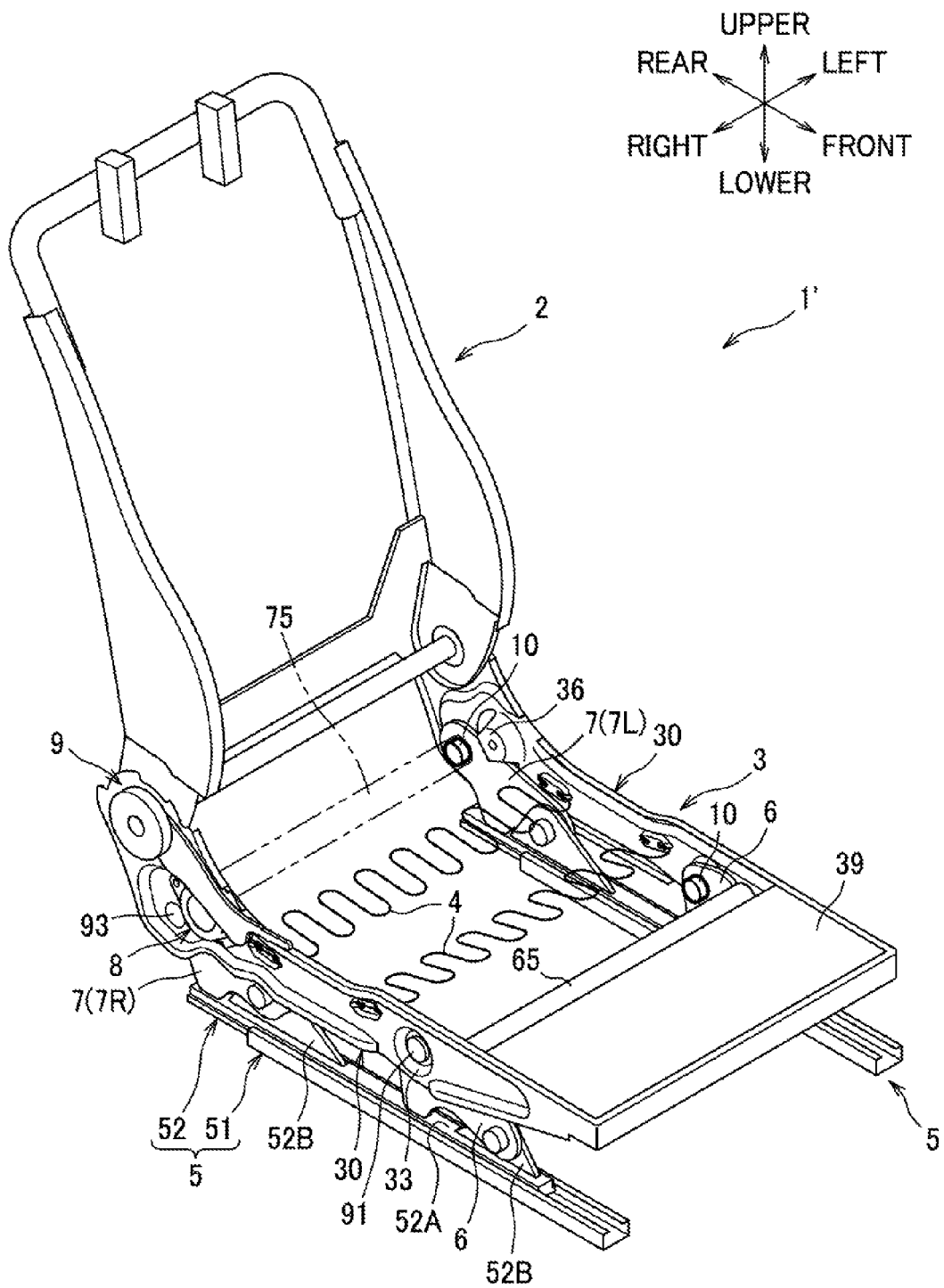
FIG. 17 is a perspective view of a car seat according to an embodiment shown for reference purposes.

Besides the present invention, a structure for suppressing interference between the operation unit and the detection sensor, as illustrated for reference purposes, may be implemented in a car seat 1' (vehicle seat) as shown in FIG. 17 in which an operation unit 8 is provided at a right side frame 30 of left and right side frames 30 (one of the side frames) and a load detection sensor 10 (detection sensor) is provided at a left side frame 30 (the other of the side frames). In this car seat 1', provision of a detection sensor provided in a joint shaft by which the link 6, 7 and the slide rail 5 are joined together is optional. It is also to be understood that a detection sensor may not be adopted in the joint shaft by which the link 6, 7 and the slide rail 5 are joined together.

What is claimed:

1. A vehicle seat with a height adjustable seat bottom, comprising:

left and right side frames each including a main body portion extending in a front-rear direction and a mount portion for a seat back frame, the mount portion protruding from a rear portion of the main body portion upward, the left and right side frames constituting left and right frames of the seat bottom;

a height adjustment mechanism configured to allow the left and right side frames to be lifted and lowered; and an operation unit including an operation member configured to be operated by an occupant to cause the height adjustment mechanism to be actuated, wherein the operation unit is so disposed that at least a part thereof lies over the mount portion, wherein one of the side frames has a recessed portion that is recessed in one of left and right directions that faces inward, the operation unit being fixed to a bottom wall of the recessed portion, wherein the height adjustment mechanism includes:

left and right rear links rotatably joined to the rear portion of the main body potion;

left and right front links rotatably joined to the main body portion at positions frontward of the rear links; and a link support member disposed below the side frames and configured to support the rear links and the front links in a manner that permits the front and rear links to rotate, to thereby form a four-bar linkage, and wherein at least the one of the side frames to which the operation unit is fixed has a link mount recess portion that is recessed relative to the bottom wall of the recessed portion in one of left and right directions that faces inward, at least one of the front links being joined to an inner side of a bottom wall of the link mount recess portion which inner side faces inward in the one of left and right directions.

2. The vehicle seat according to claim 1, wherein a drive shaft of the operation unit is disposed above a plane connecting a side frame-side center of rotation of the front links and a side frame-side center of rotation of the rear links.

3. The vehicle seat according to claim 1, wherein the side frames comprise a flange portion disposed around a region thereof which at least includes a wall to which the operation unit is fixed, and configured to protrude in one of left and right directions that faces outward relative to the wall and to extend along upper and lower edges of the side frames, and a first gap portion disposed on the edges of the side frames around a region thereof at which the main body portion and the mount portion are joined together, and configured to be flush with the wall whereby a gap is formed in the flange portion; and wherein the operation unit is disposed adjacent to the first gap portion.

4. The vehicle seat according to claim 1, wherein the side frames comprise a flange portion disposed around a region thereof which at least includes a wall to which the operation unit is fixed, and configured to protrude in one of left and right directions that faces outward relative to the wall and to extend along upper and lower edges of the side frames, and a first gap portion disposed on the edges of the side frames around a region thereof at which the main body portion and the mount portion are joined together, and configured to be flush with the wall whereby a gap is formed in the flange portion; and wherein the operation unit is so disposed that at least a part thereof lies over the first gap portion.

5. The vehicle seat according to claim 2, wherein the main body portion comprises a flange portion disposed around a region thereof which at least includes a wall to which the operation unit is fixed, and configured to protrude in one of left and right directions that faces outward relative to the wall and to extend along upper and lower edges thereof, a second gap portion disposed on a part of the lower edge and configured to be flush with the wall to which the operation unit is fixed, whereby a gap is formed in the flange portion, and a recessed portion that is recessed in one of left and right directions that faces inward.

6. The vehicle seat according to claim 1, wherein the rear link includes a second gear which is in mesh with a first gear provided in the operation unit, and through which a rotational motion of the first gear is transmitted to thereby cause the four-bar linkage to be actuated, and wherein the side frame comprises a protective wall provided integrally therewith and configured to protrude from the bottom wall and to cover, from one of left and right directions that faces inward, a region in which the first gear and the second gear are in mesh with each other.

7. The vehicle seat according to claim 1, wherein the side frames comprise a reinforcing portion disposed around the bottom wall and configured to protrude in one of left and right directions that faces outward, and to extend along upper and lower edges of the side frames, the reinforcing portion having a U-shaped cross section.

8. The vehicle seat according to claim 1, further comprising an occupant support member disposed between the main body portion of the left side frame and the main body portion of the right side frame and configured to support an occupant seated on the seat bottom, wherein a drive shaft of the operation unit is disposed rearward of the occupant support member.

9. The vehicle seat according to claim 8, wherein the occupant support member comprises a seat spring which spans between the main body portions of the left and right side frames;

wherein each of the main body portions includes an engaging portion with which end portions of the seat spring are engageable; and wherein the operation unit as a whole is disposed rearward of the engaging portion.

10. The vehicle seat according to claim 9, wherein the operation unit includes a plate-like fixing portion configured to protrude radially outward, and is fixed to the side frames with the fixing portion being disposed to face the engaging portion.

11. The vehicle seat according to claim 8, wherein a drive shaft of the operation unit is disposed at a level higher than that of the occupant support member.

12. The vehicle seat according to claim 9, further comprising a reclining mechanism configured to make an angle of the seat back frame provided at the mount portion adjustable, wherein the operation unit is disposed on a line connecting a center of rotation of the reclining mechanism and a rear end of the engaging portion as seen from a left or right direction.

13. The vehicle seat according to claim 1, wherein the operation member is configured to be caused to make a rotational motion which causes the height adjustment mechanism to be actuated to thereby adjust height of the left and right side frames; and wherein the operation unit is fixed to the side frame by welding.

14. The vehicle seat according to claim 13, wherein the operation unit includes a plate-like fixing portion protruding radially outward, and the fixing portion is welded to the side frame;

wherein the operation unit includes a first gear configured to be caused to rotate by an operation of the operation member;

wherein the height adjustment mechanism includes a second gear which is in mesh with the first gear and through which a rotational motion of the first gear is transmitted to thereby cause the left and right side frames to be lifted and lowered;

wherein the side frame and the fixing portion each have a through hole for locating the fixing portion in place relative to the side frame; and wherein the through hole of one of the side frame and the fixing portion is larger than the through hole of the other of the side frame and the fixing portion.

15. The vehicle seat according to claim 13, further comprising a reclining mechanism configured to make an angle of the seat back frame provided at a rear portion of the side frame adjustable, wherein the operation unit includes a plate-like fixing portion protruding radially outward, and the fixing portion is welded to the side frame; and wherein an outermost protruding end portion of the fixing portion is disposed above or below a line connecting a center of rotation of the reclining mechanism and a center of rotation of the operation member as seen from a left or right direction.

16. The vehicle seat according to claim 13, wherein the operation unit includes a plate-like fixing portion protruding radially outward, and the fixing portion is welded to the side frame;

wherein each of the side frames includes an engaging portion with which end portions of an occupant support member disposed between the left and right side frames and configured to support an occupant seated on the seat bottom are engageable; and wherein an outermost protruding end portion of the fixing portion is disposed above or below a line connecting a rear end of the engaging portion and a center of rotation of the operation member as seen from a left or right direction.

17. The vehicle seat according to claim 1, further comprising a detection sensor including a detection part in which a state of the seat bottom is detectable, wherein the operation member is configured to be caused to make a rotational motion which causes the height adjustment mechanism to actuated to thereby adjust height of the left and right side frames;

wherein the detection sensor is provided in a joint shaft by which the link and the side frame or the link support member are rotatably supported.

18. The vehicle seat according to claim 17, wherein the detection sensor is provided in a joint shaft by which the link and the link support member are joined;

wherein the detection sensor includes a protruding portion which protrudes from the detection part toward a left or right direction; and wherein a lower portion of the side frame has a recess provided to receive at least a part of the protruding portion of the detection sensor when the seat bottom is in a lowest position.

* * * * *